US009219595B2

(12) United States Patent
Yin et al.

(10) Patent No.: US 9,219,595 B2
(45) Date of Patent: Dec. 22, 2015

(54) SYSTEMS AND METHODS FOR CONFIGURATION SIGNALING

(71) Applicant: Sharp Laboratories of America, Inc., Camas, WA (US)

(72) Inventors: Zhanping Yin, Vancouver, WA (US); Shohei Yamada, Camas, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 310 days.

(21) Appl. No.: 13/857,132

(22) Filed: Apr. 4, 2013

(65) Prior Publication Data

US 2014/0301255 A1  Oct. 9, 2014

(51) Int. Cl.
 *H04J 3/00* (2006.01)
 *H04L 5/14* (2006.01)
 *H04W 72/12* (2009.01)
 *H04L 1/00* (2006.01)
 *H04W 72/04* (2009.01)

(52) U.S. Cl.
 CPC ............. *H04L 5/14* (2013.01); *H04W 72/1289* (2013.01); *H04L 1/00* (2013.01); *H04W 72/0486* (2013.01)

(58) Field of Classification Search
 None
 See application file for complete search history.

(56) References Cited

U.S. PATENT DOCUMENTS

| 2011/0176461 | A1 | 7/2011 | Astely et al. |
| 2011/0274015 | A1 | 11/2011 | Astely et al. |
| 2012/0113875 | A1 | 5/2012 | Alanärä et al. |
| 2013/0039193 | A1 | 2/2013 | Yin et al. |
| 2013/0044652 | A1 | 2/2013 | Wang et al. |
| 2014/0112259 | A1* | 4/2014 | Bagheri et al. ................ 370/329 |
| 2014/0269338 | A1* | 9/2014 | Jung et al. ..................... 370/241 |
| 2014/0293883 | A1* | 10/2014 | Wang et al. ................... 370/329 |

FOREIGN PATENT DOCUMENTS

| WO | 2010/086498 | 8/2010 |
| WO | 2011/077288 | 6/2011 |
| WO | 2012/167431 | 12/2012 |

OTHER PUBLICATIONS

CATT, "Further Evaluation Results on TDD UL-DL Reconfigurations," 3GPP TSG RAN WG1 Meeting #72, R1-130051, Jan. 2013.
CATT, "Signalling Mechanisms for TDD UL-DL Reconfigurations," 3GPP TSG RAN WG1 Meeting #72, R1-130052, Jan. 2013.
Intel Corporation, "Discussion on Signalling Mechanisms for TDD UL-DL Reconfiguration," 3GPP TSG RAN WG1 Meeting #72, R1-130085, Jan. 2013.
ZTE, "Signaling to Reconfigure TDD UL/DL Allocation," 3GPP TSG RAN WG1 Meeting #72, R1-130129, Jan. 2013.
ZTE, "HARQ Timing in TDD-eIMTA," 3GPP TSG RAN WG1 Meeting #72, R1-130130, Jan. 2013.
ITRI, "Evaluation of eIMTA with Different Reconfiguration Time Scaled," 3GPP TSG RAN WG1 Meeting #72, R1-130147, Jan. 2013.

(Continued)

*Primary Examiner* — Andrew Lai
*Assistant Examiner* — Jamaal Henson
(74) *Attorney, Agent, or Firm* — Austin Rapp & Hardman

(57) ABSTRACT

A User Equipment (UE) for receiving time-division duplexing (TDD) uplink/downlink (UL/DL) configurations is described. The UE includes a processor and instructions stored in memory that is in electronic communication with the processor. The UE receives a first TDD UL/DL configuration for a cell and secondary configuration information that includes at least a second TDD UL/DL configuration for the cell.

12 Claims, 12 Drawing Sheets

(56) References Cited

OTHER PUBLICATIONS

New Postcom, "Discussion on Different Signalling Mechanisms for TDD UL-DL Reconfiguration," 3GPP TSG RAN WG1 Meeting #72, R1-130163, Jan. 2013.
MediaTek Inc., "Discussion on Signaling to Support TDD UL-DL Reconfiguration," 3GPP TSG-RAN WG1 Meeting #72, R1-130216, Jan. 2013.
InterDigital, "Signaling Mechanisms to Support TDD UL-DL Reconfiguration," 3GPP TSG-RAN WG1 Meeting #72, R1-130232, Jan. 2013.
LG Electronics, "Discussion on the Signalling Mechanisms for TDD UL-DL Reconfiguration," 3GPP TSG RAN WG1 Meeting #72, R1-130261, Jan. 2013.
Samsung, "False Alarm Handling in UL-DL Reconfiguration," 3GPP TSG RAN WG1 #72, R1-130292, Jan. 2013.
Samsung, "Signaling Methods for TDD UL-DL Reconfiguration," 3GPP TSG RAN WG1 Meeting #72, R1-130293, Jan. 2013.
HTC, "Methods to Support TDD DL-UL Traffic Adaptation," 3GPP TSG-RAN WG1 #72, R1-130309, Jan. 2013.
Panasonic, "Signalling Mechanisms for TDD UL-DL Reconfiguration," 3GPP TSGT RAN WG1 Meeting #72, R1-130321, Jan. 2013.
NEC Group, "The CSI Measurement for Dynamic TDD System," 3GPP TSG RAN WG1 Meeting #72, R1-130369, Jan. 2013.
NEC Group, "Reconfiguration Signalling and HARQ-Timing for TDD eIMTA System," 3GPP TSG RAN WG1 Meeting #72, R1-130370, Jan. 2013.
NEC Gropu, "Study of Backward Compatibility of TDD eIMTA System," 3GPP TSG RAN WG1 Meeting #72, R1-130371, Jan. 2013.
Research in Motion, UK Limited, "Signalling Methods for TDD UL/DL Reconfiguration with Different Time Scales," 3GPP TSG RAN WG1 Meeting #72, R1-130389, Jan. 2013.
Renesas Mobile Europe Ltd., "Discussion on Backward Compatibility for TDD UL-DL Reconfiguration," 3GPP TSG RAN WG1 Meeting #72, R1-130421, Jan. 2013.
Renesas Mobile Europe Ltd., "Discussion on Signaling Mechanisms for TDD UL-DL Reconfiguration," 3GPP TSG RAN WG1 Meeting #72, R1-130422, Jan. 2013.
Huawei, HiSilicon, "Potential Signaling Enhancements for TDD eIMTA," 3GPP TSG RAN WG1 Meeting #72, R1-130445, Jan. 2013.
Alcatel-Lucent Shanghai Bell, Alcatel-Lucent, "Discussion on Signalling Mechanisms for TDD UL-DL Reconfiguration," 3GPP TSG RAN WG1 Meeting #72, R1-130459, Jan. 2013.
Nokia, Nokia Siemens Networks, "Discussion on Signalling Mechanisms for Dynamic TDD UL-DL Reconfiguration," 3GPP TSG-RAN WG1 Meeting #72, R1-130488, Jan. 2013.
Pantech, "Discussion on Signaling Methods for TDD UL-DL Reconfiguration," 3GPP TSG RAN1 #72, R1-130524, Jan. 2013.
Sharp, "PHY Layer Signalling Considerations of Dynamic TDD UL-DL Reconfiguration," 3GPP TSG-RAN WG1 #72, R1-130532, Jan. 2013.
CMCC, "On Flexible TDD UL-DL Configuration," 3GPP TSG-RAN WG #72, R1-130535, Jan. 2013.
Ericsson, ST-Ericsson, "Dynamic TDD on NCT," 3GPP TSG-RAN WG1 #72, R1-130557, Jan. 2013.
Ericsson, ST-Ericsson, "Signalling Support for Dynamic TDD," 3GPP TSG-RAN WG1 #72, R1-130558, Jan. 2013.
Qualcomm Incorporated, "Signaling Mechanisms for Reconfiguration," 3GPP TSG RAN WG1 Meeting #72, R1-130587, Jan. 2013.
Ericsson, "Finalization for Introducing of Rel-11 Features," 3GPP TSG-RAN WG1 Meeting #71, R1-125402, Nov. 2012.
Editor (Motorola Mobility), "Finalisation for Introducing Rel-11 Features," 3GPP TSG-RAN WG1 Meeting #71, R1-125404, Nov. 2012.
Huawei, "Finalisation for Introducing Rel-11 Features," 3GPP TSG-RAN WG1 Meeting #71, R1-125403, Nov. 2012.
3GPP TR 36.828 V2.0.0, "Further Enhancements to LTE TDD for DL-UL Interference Management and Traffic Adaptation; (Release 11)," Jun. 2012.
CATT, "New Work Item Proposal for Further Enhancements to LTE TDD for DL-UL Interference Management and Traffic Adaptation," 3GPP TSG-RAN Meeting #58, RP-121772, Dec. 2012.
Samsung, "Signaling methods for TDD UL-DL reconfiguration," 3GPP TSG RAN WG1 #72, R1-130293, Jan. 2013.
HTC, "On HARQ Timing Issues for TDD UL-DL Reconfiguration," 3GPP TSG-RAN WG1 #72, R1-130310, Jan. 2013.
Samsung, "Dynamic reconfiguration of TDD UL-DL configuration," 3GPP TSG RAN WG1 Meeting #69, R1-122267, May 2012.
International Search Report issued for International Application No. PCT/JP2014/001895 on Jun. 24, 2014.

\* cited by examiner

US 9,219,595 B2

SYSTEMS AND METHODS FOR CONFIGURATION SIGNALING

TECHNICAL FIELD

The present disclosure relates generally to communication systems. More specifically, the present disclosure relates to systems and methods for configuration signaling.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
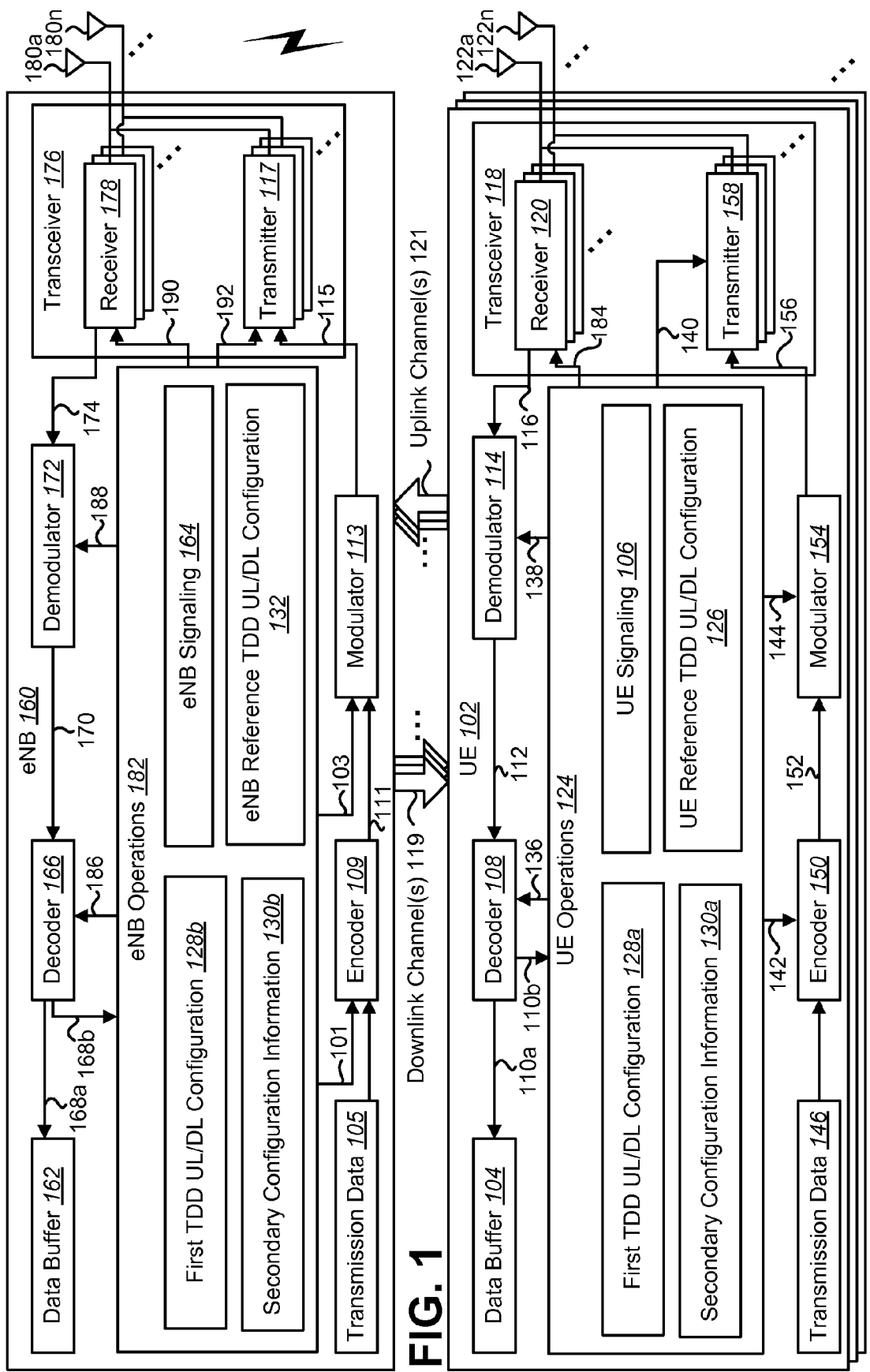
FIG. 1 is a block diagram illustrating one configuration of one or more evolved Node Bs (eNBs) and one or more User Equipments (UEs) in which systems and methods for configuration signaling may be implemented.

A user equipment (UE) for receiving time-division duplexing (TDD) uplink/downlink (UL/DL) configurations is described. The UE includes a processor and executable instructions stored in memory that is in electronic communication with the processor. The UE receives a first TDD UL/DL configuration for a cell and secondary configuration information that includes at least a second TDD UL/DL configuration for the cell.

The UE may determine a downlink (DL)-reference TDD UL/DL configuration based on the first TDD UL/DL configuration and the second TDD UL/DL configuration. The UE may also perform Physical Downlink Shared Channel (PDSCH) operations based on the DL-reference TDD UL/DL configuration.

The UE may determine an uplink (UL)-reference TDD UL/DL configuration based on the first TDD UL/DL configuration and the second TDD UL/DL configuration. The UE may also perform Physical Uplink Shared Channel (PUSCH) operations based on the UL-reference TDD UL/DL configuration.

The secondary configuration information may also include a third TDD UL/DL configuration. The UE may determine a DL-reference TDD UL/DL configuration based on the second TDD UL/DL configuration and the third TDD UL/DL configuration. The UE may also perform PDSCH operations based on the DL-reference TDD UL/DL configuration.

When the secondary configuration information includes a third TDD UL/DL configuration, the UE may determine a UL-reference TDD UL/DL configuration based on the second TDD UL/DL configuration and the third TDD UL/DL configuration. The UE may also perform PUSCH operations based on the UL-reference TDD UL/DL configuration.

When the secondary configuration information includes a third TDD UL/DL configuration, the UE may determine a DL-reference TDD UL/DL configuration based on the first TDD UL/DL configuration, the second TDD UL/DL configuration and the third TDD UL/DL configuration. The UE may also perform PDSCH operations based on the DL-reference TDD UL/DL configuration.

When the secondary configuration information includes a third TDD UL/DL configuration, the UE may determine a UL-reference TDD UL/DL configuration based on the first TDD UL/DL configuration, the second TDD UL/DL configuration and the third TDD UL/DL configuration. The UE may also perform PUSCH operations based on the UL-reference TDD UL/DL configuration.

The first TDD UL/DL configuration may be signaled in a system information block (SIB) or a radio resource control (RRC) common message. The secondary configuration information may be signaled in at least one SIB or at least one RRC common message. The SIB or RRC common message may include a secondary TDD configuration information element. The secondary TDD configuration information element may include one or more TDD UL/DL configurations. The secondary TDD configuration information element may also include an index of combinations of TDD UL/DL configurations.

An evolved Node B (eNB) for sending TDD UL/DL configurations is also described. The eNB includes a processor and executable instructions stored in memory that is in electronic communication with the processor. The eNB sends a first TDD UL/DL configuration for a cell and secondary configuration information that includes at least a second TDD UL/DL configuration.

The eNB may determine a DL-reference TDD UL/DL configuration based on the first TDD UL/DL configuration and the second TDD UL/DL configuration. The eNB may also perform PDSCH operations based on the DL-reference TDD UL/DL configuration.

The eNB may determine a UL-reference TDD UL/DL configuration based on the first TDD UL/DL configuration and the second TDD UL/DL configuration. The eNB may also perform PUSCH operations based on the UL-reference TDD UL/DL configuration.

The secondary configuration information may also include a third TDD UL/DL configuration. The eNB may determine a DL-reference TDD UL/DL configuration based on the second TDD UL/DL configuration and the third TDD UL/DL configuration. The eNB may also perform PDSCH operations based on the DL-reference TDD UL/DL configuration.

When the secondary configuration information includes a third TDD UL/DL configuration, the eNB may determine a UL-reference TDD UL/DL configuration based on the second TDD UL/DL configuration and the third TDD UL/DL configuration. The eNB may also perform PUSCH operations based on the UL-reference TDD UL/DL configuration.

When the secondary configuration information includes a third TDD UL/DL configuration, the eNB may determine a DL-reference TDD UL/DL configuration based on the first TDD UL/DL configuration, the second TDD UL/DL configuration and the third TDD UL/DL configuration. The eNB may also perform PDSCH operations based on the DL-reference TDD UL/DL configuration.

When the secondary configuration information includes a third TDD UL/DL configuration, the eNB may determine a UL-reference TDD UL/DL configuration based on the first TDD UL/DL configuration, the second TDD UL/DL configuration and the third TDD UL/DL configuration. The eNB may also perform PUSCH operations based on the UL-reference TDD UL/DL configuration.

The first TDD UL/DL configuration may be signaled in an SIB or an RRC common message. The secondary configuration information may be signaled in at least one SIB or at least one RRC common message. The SIB or RRC common message may include a secondary TDD configuration information element. The secondary TDD configuration information element may include one or more TDD UL/DL configurations. The secondary TDD configuration information element may also include an index of combinations of TDD UL/DL configurations.

A method for receiving TDD UL/DL configurations by a UE is also described. The method includes receiving a first TDD UL/DL configuration for a cell and secondary configuration information that includes at least a second TDD UL/DL configuration for the cell.

A method for sending TDD UL/DL configurations by an eNB is also described. The method includes sending a first TDD UL/DL configuration for a cell and secondary configuration information that includes at least a second TDD UL/DL configuration for the cell.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g., eNB).

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein describe configuration signaling associated with dynamic TDD UL/DL reconfiguration. In particular, the systems and methods disclosed herein describe TDD UL/DL configuration signaling and reference TDD UL/DL configurations for dynamic TDD UL/DL reconfiguration cells. It should be noted that dynamic TDD UL/DL reconfiguration may also be referred to as enhanced interference mitigation with traffic adaptation (eIMTA). Therefore, a cell that supports dynamic TDD UL/DL reconfiguration (e.g., a dynamic TDD UL/DL reconfiguration cell) may be referred to as an eIMTA cell.

Enhanced interference mitigation with traffic adaptation (eIMTA) is a major topic for LTE TDD networks to enable more flexible use of spectrum using dynamic TDD UL/DL allocation based on traffic load. Therefore, some subframes may be flexible and convertible and may be used as either downlink or uplink as described below. A TDD UL/DL configuration may also be referred to as a TDD UL-DL reconfiguration.

Several signaling methods have been considered in an LTE Release-11 study, including system information change, radio resource control (RRC) signaling, medium access control (MAC) signaling and physical (PHY) layer signaling. It was concluded that the faster the reconfiguration is, the higher the benefits from dynamic TDD UL/DL reconfiguration. The reconfiguration time scale and signaling methods can be divided into two categories. In a first implementation, a new TDD UL/DL configuration is signaled, and then a transition from the old TDD UL/DL configuration to the new TDD UL/DL configuration is performed. In this implementation, the transition behavior has to be specified. During the transition period, the association timing has to be changed from the old TDD UL/DL configuration to the new TDD UL/DL configuration. In a second implementation, multiple reference TDD UL/DL configurations may be signaled, one or more reference TDD UL/DL configurations may be determined and the reference TDD UL/DL configurations may be followed to achieve different TDD UL/DL subframe allocations. In the systems and methods described herein, the second implementation (e.g., signaling multiple reference TDD UL/DL configurations) is considered.

A dynamic TDD UL/DL reconfiguration cell may be configured with a default TDD UL/DL configuration and an allowed TDD UL/DL reconfiguration range. The TDD UL/DL reconfiguration range may be a set of TDD UL/DL configurations, or other states between two configured TDD UL/DL configurations. Therefore, a dynamic TDD UL/DL reconfiguration cell may be configured with multiple TDD UL/DL configurations.

A first TDD UL/DL configuration may be a default TDD UL/DL configuration. The first TDD UL/DL configuration may also be referred to as a primary TDD UL/DL configuration. In one implementation, a second TDD UL/DL configuration may be configured in addition to the first TDD UL/DL configuration. In another implementation, a second TDD UL/DL configuration and a third TDD UL/DL configuration may be configured in addition to the first TDD UL/DL configuration. The second TDD UL/DL configuration and the third TDD UL/DL configuration may be defined as secondary TDD UL/DL configurations. Therefore, a dynamic TDD UL/DL reconfiguration cell may be configured with a first TDD UL/DL configuration and at least one secondary TDD UL/DL configuration.

A dynamic TDD UL/DL reconfiguration cell may be used as a primary serving cell (PCell) or a secondary serving cell (SCell). In one implementation, the first (e.g., primary) TDD UL/DL configuration may be signaled by a tdd-config information element (IE) as in Release-8, 9, 10 and 11 for a PCell. However, several methods may be used to signal the secondary TDD UL/DL configurations of a dynamic TDD UL/DL reconfiguration cell. The systems and methods described herein provide detailed IE structure to signal the secondary TDD UL/DL configurations. The secondary TDD UL/DL configurations may be transmitted in different signals to provide cell-specific TDD UL/DL configurations or UE-specific TDD UL/DL configurations.

The combinations of the configured first and secondary TDD UL/DL configurations of a dynamic TDD UL/DL reconfiguration cell may define fixed and flexible subframes. For example, the multiple configured TDD UL/DL configurations may be used to determine the downlink (DL)-reference TDD UL/DL configuration and the uplink (UL)-reference TDD UL/DL configuration. The DL-reference TDD UL/DL configuration may be used for PDSCH hybrid automatic repeat request acknowledgement (HARQ-ACK) reporting timing, and the UL-reference TDD UL/DL configuration may be used for physical uplink shared channel (PUSCH) scheduling and PUSCH HARQ-ACK timing.

The described systems and methods may use combinations of RRC and PHY signaling, and eliminate the need for TDD UL/DL configuration transition by other methods. In some implementations, the described systems and methods provide detailed signaling methods and an information element (IE) structure to configure one or more TDD UL/DL configurations for a dynamic TDD UL/DL reconfiguration cell. Systems and methods to derive reference TDD UL/DL configurations for a dynamic TDD UL/DL reconfiguration cell are also described. Furthermore, the described systems and methods provide backward compatibility to legacy UEs (e.g., Release-11 and earlier UEs), and define the TDD UL/DL reconfiguration range and subframes that are allowed for dynamic TDD UL/DL reconfiguration. Additionally, the described systems and methods improve PHY layer signaling speed for dynamic subframe allocation by reusing standard TDD UL/DL configuration timings.

A dynamic TDD UL/DL reconfiguration cell is a TDD cell that supports dynamic TDD UL/DL reconfiguration to adapt the traffic load on the cell. In LTE time-division duplexing (LTE TDD), the same frequency band may be used for both uplink and downlink signals. To achieve different DL and UL allocations (e.g., traffic ratios) in LTE TDD, seven UL/DL configurations are given in 3GPP specifications (e.g., 3GPP TS 36.211). These allocations can allocate between 40% and 90% of subframes to DL signals.

According to current specifications (e.g., LTE Releases 8, 9, 10 and 11), a system information change procedure is used to change the TDD UL/DL configuration. This procedure has a long delay, and requires a cold system restart (e.g., all UEs in a system cannot transmit and receive for a certain period of time in order to disconnect the TDD UL/DL associations of the old TDD UL/DL configuration and set up new associations). It should be noted that a subframe association may be referred to as a "UL/DL association," which may include UL-to-DL subframe associations and DL-to-UL subframe associations. Examples of associations include association of a DL subframe (PDCCH) to UL power control in a UL subframe, association of a DL subframe physical DL control channel (PDCCH) to physical UL shared channel (PUSCH) allocation in a UL subframe, associations of acknowledgement and negative acknowledgement (ACK/NACK) feedback on UL subframe(s) for physical downlink shared channel (PDSCH) transmissions in DL subframe(s), association of acknowledgement and negative acknowledgement (ACK/NACK) feedback on a physical hybrid automatic repeat request (HARQ) indicator channel (PHICH) or physical downlink control channel (PDCCH) for physical UL shared channel (PUSCH) transmission(s) in UL subframe(s), etc.

Known PHY layer signaling may be extended to enable dynamic DL-to-UL conversion. For example, a special subframe type 2 may be used, which may be viewed as an extension of a current standard special subframe that is used for DL-to-UL transition. This special subframe type 2 can be used to provide UL transmissions while maintaining existing TDD UL/DL associations. PHY layer signaling may also include using DCI 0/4 formats for PUSCH scheduling following the association timings of an UL-reference TDD UL/DL configuration, and using DCI formats 1/2 and extensions for PDSCH scheduling, etc.

As used herein, a "Release 12 UE" may be a UE that may operate in accordance with anticipated 3GPP Release 12 specifications and possibly subsequent specifications. A Release 12 UE may be a UE that supports dynamic TDD UL/DL reconfiguration. Additionally, as used herein, a "legacy UE" may be a UE that may operate in accordance with earlier (e.g., LTE Releases 8, 9, 10, 11) specifications.

Dynamic TDD UL/DL reconfiguration may be applied for both DL-to-UL and UL-to-DL reconfiguration or switching. Dynamic TDD UL/DL reconfiguration allows applying one TDD UL/DL configuration for PDSCH hybrid automatic repeat request acknowledgement (HARQ-ACK) timing and applying another TDD UL/DL configuration for PUSCH scheduling and PUSCH HARQ-ACK timing. UEs that support dynamic TDD UL/DL reconfiguration may follow these timings based on the corresponding reference TDD UL/DL configurations in an allowed TDD UL/DL reconfiguration range (e.g., switching region). Legacy UEs may follow the existing associations without any change or knowledge of the dynamic TDD UL/DL reconfiguration. However, the eNB may restrict the legacy UEs in some subframes to maintain backward compatible timing.

In known LTE TDD systems, the UL and DL allocation is chosen from seven defined TDD UL/DL configurations, and is synchronized system-wide. Currently, TDD UL/DL allocation reconfiguration in a cell may be very costly because all transmissions have to be stopped to adjust the TDD UL/DL associations. A change in one cell may cause or accompany a sequence of changes at neighbor cells (and their neighbor cells, etc.) to match TDD UL/DL configuration synchronization at neighbor cells (and their neighbor cells, etc.). Furthermore, current TDD UL/DL allocation reconfiguration requires a system information change, which has long delay and is not adaptive to instantaneous or short-term changes in traffic load.

In current specifications (e.g., LTE Releases 8, 9, 10 and 11), a system information change procedure may be used to change the TDD UL/DL configuration. This procedure requires multiple broadcast channel intervals and thus has a long delay and cannot adapt to an instantaneous traffic load change. Due to different TDD UL/DL associations, all transmitters may have to turn off transmissions altogether to disconnect the TDD UL/DL associations of the old TDD UL/DL configuration and to set up the new associations.

This may cause a huge loss of system capacity (e.g., offered load on uplink or downlink) and user traffic interruption. Therefore, the reconfiguration of UL and DL allocation may also be very costly. Furthermore, a change in one cell may force adjacent cells to change their TDD UL/DL configurations. Thus, a "ripple" effect may occur. With high traffic load fluctuation, frequent TDD UL/DL reconfiguration may cause serious network problems.

When the network aggregated traffic load-to-capacity ratio is low, a TDD UL/DL configuration is acceptable if the UL traffic and DL traffic load can be supported by the allocated UL subframes and DL subframes, respectively. In this case, the actual TDD UL/DL traffic ratio may be the same or different from the TDD UL/DL allocation. On the other hand, if the total traffic load-to-capacity ratio is high, a better matching TDD UL/DL ratio may be configured.

A reconfiguration may be needed in several cases. For example, a reconfiguration may be needed if the allocated UL resource cannot support the UL traffic load. In another example, reconfiguration may be needed if the allocated DL resource cannot support the DL traffic load. Furthermore, a reconfiguration may be used to adapt to a traffic load with a better matching TDD UL/DL allocation. For instance, a reconfiguration may be needed if a current TDD UL/DL configuration does not match the UL-to-DL traffic ratio.

In order to better adapt to traffic conditions, dynamic TDD UL/DL reconfiguration procedures may be supported aside from the system information change. Dynamic TDD UL/DL reconfiguration may maintain backward compatibility (for legacy UEs, for example) and provide more flexibility (for UEs operating in accordance with Release 12 specifications and beyond, for example) with fast subframe modifications based on real-time traffic changes. Furthermore, different TDD UL/DL configurations in neighboring cells may be supported (in Release 11, for example) in a temporary or persistent manner with co-channel interference mitigation techniques. The different TDD UL/DL configurations may be caused by different initial network configurations and/or by dynamic TDD UL/DL reconfiguration changes with traffic adaptation. The purpose of dynamic TDD UL/DL reconfiguration may not be limited to traffic conditions. For example, there may be one or multiple factors that may be considered when deciding to use dynamic TDD UL/DL reconfiguration (e.g., interference mitigation, overhead reduction, mobility, an operator's decision, etc.).

In Releases 8, 9, 10 and 11, the TDD UL/DL associations on PDSCH HARQ-ACK, PUSCH scheduling and PUSCH HARQ-ACK are defined by the TDD UL/DL configuration. All legacy UEs in the network follow the same PDSCH HARQ-ACK report associations defined by the given TDD UL/DL configuration. Similarly, all legacy UEs in the network follow the same PUSCH scheduling and PUSCH HARQ-ACK report associations defined by the given TDD UL/DL configuration.

However, dynamic TDD UL/DL reconfiguration provides an approach that may separate PDSCH and PUSCH timing associations based on different reference TDD UL/DL configurations. For example, a network (e.g., one or more UEs and one or more eNBs) may be configured to allow dynamic TDD UL/DL reconfiguration based on traffic adaptation (aside from the default TDD UL/DL configuration as in Releases 8, 9, 10 and 11). For instance, a UE that is configured to allow dynamic TDD UL/DL reconfiguration may utilize one reference TDD UL/DL configuration for PDSCH HARQ-ACK association (e.g., a DL-reference TDD UL/DL configuration) and another reference TDD UL/DL configuration for PUSCH scheduling and PUSCH HARQ-ACK association (e.g., an UL-reference TDD UL/DL configuration), while the UE has knowledge of a default TDD UL/DL configuration (e.g., a first TDD UL/DL configuration). Therefore, because a dynamic TDD UL/DL reconfiguration cell may dynamically change its TDD UL/DL configuration, the DL-reference TDD UL/DL configuration and UL-reference TDD UL/DL configuration should be specified.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope as claimed, but is merely representative of the systems and methods.

FIG. 1 is a block diagram illustrating one implementation of one or more eNBs 160 and one or more UEs 102 in which systems and methods for configuration signaling may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 110a-b. For example, a first UE-decoded signal 110a may comprise received payload data, which may be stored in a data buffer 104. A second UE-decoded signal 110b may comprise overhead data and/or control data. For example, the second UE-decoded signal 110b may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE signaling module 106, a UE reference TDD UL/DL configuration module 126, a first TDD UL/DL configuration 128b and secondary configuration information 130b.

It should be noted that in some implementations, the UE 102 may include built-in support for dynamic TDD UL/DL reconfiguration. A UE 102 may have different behaviors depending on whether the UE 102 includes support for dynamic TDD UL/DL reconfiguration. For example, a Release-12 UE 102 may support eIMTA (e.g., a Release-12 UE 102 may support dynamic TDD UL/DL reconfiguration). However, a legacy (e.g., Release-11) UE 102 may not support eIMTA.

The UE signaling module 106 may receive a first (e.g., primary) TDD UL/DL configuration 128a for a cell. The cell may be a dynamic TDD UL/DL reconfiguration cell (e.g., an eIMTA cell). A dynamic TDD UL/DL reconfiguration cell may be used as a primary serving cell (PCell) or a secondary serving cell (SCell). Different TDD UL/DL configuration signaling methods may be employed for an eIMTA PCell and an eIMTA SCell. The UE signaling module 106 may receive signaling to configure the UE 102 with the cell. The signaling may indicate the first TDD UL/DL configuration 128a for the cell. The UE signaling module 106 may receive the first TDD UL/DL configuration in one or more messages sent from an eNB 160.

The first TDD UL/DL configuration 128a may be the default TDD UL/DL configuration for the cell. The first TDD UL/DL configuration 128a may also be referred to as a primary TDD UL/DL configuration. The first TDD UL/DL configuration 128a may be signaled as described below in connection with FIG. 2. For example, the first TDD UL/DL configuration 128a may be signaled by a tdd-Config IE.

If the cell is a PCell, in one implementation, the UE signaling module 106 may receive the first TDD UL/DL configuration 128a in a tdd-Config field in a system information block (SIB) message. An example of signaling the first TDD UL/DL configuration 128a in an SIB is illustrated in Listing (1) below.

In another implementation, if the cell is a PCell, the UE signaling module 106 may receive the first TDD UL/DL configuration 128a in a radio resource control (RRC) common message. For example, a tdd-Config field in a RRC common block may be used to indicate the first TDD UL/DL configuration 128a of the cell. An example of signaling the first TDD UL/DL configuration 128a in an RRC common message is illustrated in Listing (3) below.

If the cell is an SCell, the UE signaling module 106 may also receive the first TDD UL/DL configuration 128a in an RRC common message. An example of signaling the first TDD UL/DL configuration 128a of an SCell in an RRC common message is illustrated in Listing (4) below.

The UE signaling module 106 may receive secondary configuration information 130a for the cell. In one implementation, the UE signaling module 106 may receive the secondary configuration information 130a in the same message (e.g., SIB or RRC) as the first TDD UL/DL configuration 128a. In another implementation, the UE signaling module 106 may receive the secondary configuration information 130a in a message (e.g., SIB or RRC) separate from the first TDD UL/DL configuration 128a. The secondary configuration information 130 may be sent from an eNB 160.

The secondary configuration information 130a may include an allowed TDD UL/DL reconfiguration range. The TDD UL/DL reconfiguration range may be a set of TDD UL/DL configurations, or any states between two TDD UL/DL configurations.

In one implementation, in addition to the first TDD UL/DL configuration 128a, at least a second TDD UL/DL configuration may be configured for the dynamic TDD UL/DL reconfiguration cell. In another implementation, a second TDD UL/DL configuration and a third TDD UL/DL configuration may be configured in addition to the first TDD UL/DL configuration 128a.

The UE signaling module 106 may receive the secondary configuration information 130a in a secondary TDD configuration IE. The secondary TDD configuration IE may include one or two secondary TDD UL-DL configurations (e.g., the second or third TDD UL/DL configurations).

In one implementation, the secondary TDD UL/DL configurations may be indicated in the secondary TDD configuration IE. For one extra TDD UL/DL configuration, the UE signaling module 106 may receive a secondary TDD configuration IE as illustrated in Listing (5) below. For two extra TDD UL/DL configurations, the UE signaling module 106 may receive a secondary TDD configuration IE as illustrated in Listing (6) below.

In another implementation, the secondary TDD configuration IE may include an index of combinations of TDD UL/DL configurations, as illustrated in Table (1) and Table (2) below. An index of the table entries may be used to indicate the allowed TDD UL/DL reconfiguration range.

Different TDD UL/DL configuration signaling methods may be employed for a dynamic TDD UL/DL reconfiguration PCell and a dynamic TDD UL/DL reconfiguration SCell. If a dynamic TDD UL/DL reconfiguration cell is a PCell, the secondary configuration information 130a may be signaled in an SIB, as illustrated in Listing (8) below, or in an RRC block, as illustrated in Listing (9) below. If a dynamic TDD UL/DL reconfiguration cell is an SCell, the secondary configuration information 130a may be signaled by adding an extension tdd-Config-r12 field in an RRC block, as illustrated in Listing (10) below.

The UE reference TDD UL/DL configuration module 126 may determine a reference TDD UL/DL configuration based on either or both of the first TDD UL/DL configuration 128a and the secondary configuration information 130a. A DL-reference TDD UL/DL configuration may be determined based on either or both of the first (e.g., primary) TDD UL/DL configuration 128a and the secondary configuration information 130a (e.g., secondary TDD UL/DL configurations). The DL-reference TDD UL/DL configuration may be used for PDSCH HARQ-ACK timing of the dynamic TDD UL/DL reconfiguration cell.

A UL-reference TDD UL/DL configuration may also be determined based on either or both of the first TDD UL/DL configuration 128a and the secondary configuration information 130a. The UL-reference TDD UL/DL configuration may be used for PUSCH scheduling and PUSCH HARQ-ACK timing of the dynamic TDD UL/DL reconfiguration cell.

The reference TDD UL/DL configurations (e.g., DL-reference and UL-reference TDD UL/DL configurations) may be determined in different ways depending on whether the secondary configuration information 130a includes one or two secondary TDD UL/DL configurations.

In one scenario, the secondary configuration information 130a may include one extra TDD UL/DL configuration, which may be a second TDD UL/DL configuration. In one implementation, the DL-reference TDD UL/DL configuration and UL-reference TDD UL/DL configuration may be selected from the existing TDD UL/DL configurations, as described below in connection with FIG. 2.

In another implementation, the first TDD UL/DL configuration 128a may be used as the DL-reference TDD UL/DL configuration, and the second TDD UL/DL configuration may be used as the UL-reference TDD UL/DL configuration. In yet another implementation, the first TDD UL/DL configuration 128a may be used as the UL-reference TDD UL/DL configuration, and the second TDD UL/DL configuration may be used as the DL-reference TDD UL/DL configuration.

In another scenario, the secondary configuration information 130a may include two extra TDD UL/DL configurations, which may be a second TDD UL/DL configuration and a third TDD UL/DL configuration. In one approach, only the secondary TDD UL/DL configurations (e.g., the second and third TDD UL/DL configurations) are used to determine the reference TDD UL/DL configurations, as described in FIG. 2. In another approach, the primary and both of the two secondary TDD UL/DL configurations are used to determine the reference TDD UL/DL configurations, as described in FIG. 2.

The UE operations module 124 may provide information 184 to the one or more receivers 120. For example, the UE operations module 124 may inform the receiver(s) 120 when to receive retransmissions. In some implementations, this may be based on the DL-reference TDD UL/DL configuration and/or the UL-reference TDD UL/DL configuration.

The UE operations module 124 may provide information 138 to the demodulator 114. For example, the UE operations module 124 may inform the demodulator 114 of a modulation pattern anticipated for transmissions from the eNB 160. In some implementations, this may be based on the DL-reference TDD UL/DL configuration and/or the UL-reference TDD UL/DL configuration.

The UE operations module 124 may provide information 136 to the decoder 108. For example, the UE operations module 124 may inform the decoder 108 of an anticipated encoding for transmissions from the eNB 160. In some implementations, this may be based on the DL-reference TDD UL/DL configuration and/or the UL-reference TDD UL/DL configuration.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158.

For example, the UE operations module 124 may instruct the one or more transmitters 158 when to transmit a signal to the eNB 160. In some implementations, this may be based on the DL-reference TDD UL/DL configuration or UL-reference TDD UL/DL configuration (determined by the UE reference TDD UL/DL configuration module 132a, for example). For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 168a-b. For example, a first eNB-decoded signal 168a may comprise received payload data, which may be stored in a data buffer 162. A second eNB-decoded signal 168b may comprise overhead data and/or control data. For example, the second eNB-decoded signal 168b may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include an eNB signaling module 164, an eNB reference TDD UL/DL configuration module 132, a first TDD UL/DL configuration 128b and secondary configuration information 130b.

The eNB signaling module 164 may send a first (e.g., primary) TDD UL/DL configuration 128b for a cell. The cell may be a dynamic TDD UL/DL reconfiguration cell (e.g., an eIMTA cell). A dynamic TDD UL/DL reconfiguration cell may be used as a primary serving cell (PCell) or a secondary serving cell (SCell). The eNB signaling module 164 may send signaling to a UE 102 to configure the UE 102 with the cell. The signaling may indicate the first TDD UL/DL configuration 128b for the cell.

The first TDD UL/DL configuration 128b may be the default TDD UL/DL configuration for the cell. The first TDD UL/DL configuration 128b may also be referred to as a primary TDD UL/DL configuration. The first TDD UL/DL configuration 128b may be signaled as described below in connection with FIG. 2. For example, the first TDD UL/DL configuration 128b may be signaled by a tdd-Config IE.

If the cell is a PCell, in one implementation, the eNB signaling module 164 may send the first TDD UL/DL configuration 128b in a tdd-Config field in an SIB message. An example of signaling the first TDD UL/DL configuration 128b in an SIB is illustrated in Listing (1) below.

In another implementation, if the cell is a PCell, the eNB signaling module 164 may send the first TDD UL/DL configuration 128b in an RRC common message. For example, a tdd-Config field in a RRC common block may be used to indicate the first TDD UL/DL configuration 128b of the cell. An example of signaling the first TDD UL/DL configuration 128b in an RRC common message is illustrated in Listing (3) below.

If the cell is an SCell, the eNB signaling module 164 may also send the first TDD UL/DL configuration 128b in an RRC common message. An example of signaling the first TDD UL/DL configuration 128b of an SCell in an RRC common message is illustrated in Listing (4) below.

The eNB signaling module 164 may send secondary configuration information 130b for the cell. In one implementation, the eNB signaling module 164 may send the secondary configuration information 130b in the same message (e.g., SIB or RRC) as the first TDD UL/DL configuration 128b. In another implementation, the eNB signaling module 164 may send the secondary configuration information 130b in a message (e.g., SIB or RRC) separate from the first TDD UL/DL configuration 128b.

The secondary configuration information 130b may include an allowed TDD UL/DL reconfiguration range. The TDD UL/DL reconfiguration range may be a set of TDD UL/DL configurations, or any states between two TDD UL/DL configurations.

In one implementation, in addition to the first TDD UL/DL configuration 128b, at least a second TDD UL/DL configuration may be configured for the dynamic TDD UL/DL reconfiguration cell. In another implementation, a second TDD UL/DL configuration and a third TDD UL/DL configuration may be configured in addition to the first TDD UL/DL configuration 128b.

The eNB signaling module 164 may send the secondary configuration information 130b in a secondary TDD configuration IE. The secondary TDD configuration IE may include one or two secondary TDD UL-DL configurations (e.g., the second or third TDD UL/DL configurations).

In one implementation, the secondary TDD UL/DL configurations may be indicated in the secondary TDD configuration IE. For one extra TDD UL/DL configuration, the eNB signaling module 164 may send a secondary TDD configuration IE as illustrated in Listing (5) below. For two extra TDD UL/DL configurations, the eNB signaling module 164 may send a secondary TDD configuration IE as illustrated in Listing (6) below.

In another implementation, the secondary TDD configuration IE may include an index of combinations of TDD UL/DL configurations, as illustrated in Table (1) and Table (2) below. An index of the table (e.g., Table (1) or Table (2)) entries may be used to indicate the allowed TDD UL/DL reconfiguration range.

Different TDD UL/DL configuration signaling methods may be employed for a dynamic TDD UL/DL reconfiguration PCell and a dynamic TDD UL/DL reconfiguration SCell. If a dynamic TDD UL/DL reconfiguration cell is a PCell, the secondary configuration information 130b may be signaled in an SIB, as illustrated in Listing (8) below, or in an RRC block, as illustrated in Listing (9) below. If a dynamic TDD UL/DL reconfiguration cell is an SCell, the secondary configuration information 130b may be signaled by adding an extension tdd-Config-r12 field in an RRC block, as illustrated in Listing (10) below.

The eNB reference TDD UL/DL configuration module 132 may determine a reference TDD UL/DL configuration based on either or both of the first TDD UL/DL configuration 128b and the secondary configuration information 130b. A DL-reference TDD UL/DL configuration may be determined based on either or both of the first (e.g., primary) TDD UL/DL configuration 128b and the secondary configuration information 130b (e.g., secondary TDD UL/DL configurations). The DL-reference TDD UL/DL configuration may be used for PDSCH HARQ-ACK timing of the dynamic TDD UL/DL reconfiguration cell.

A UL-reference TDD UL/DL configuration may also be determined based on either or both of the first TDD UL/DL configuration 128b and the secondary configuration information 130b. The UL-reference TDD UL/DL configuration may be used for PUSCH scheduling and PUSCH HARQ-ACK timing of the dynamic TDD UL/DL reconfiguration cell.

The reference TDD UL/DL configurations (e.g., DL-reference and UL-reference TDD UL/DL configurations) may be determined in different ways depending on whether the secondary configuration information 130b includes one or two secondary TDD UL/DL configurations.

In one scenario, the secondary configuration information 130b may include one extra TDD UL/DL configuration, which may be a second TDD UL/DL configuration. In one implementation, the DL-reference TDD UL/DL configuration and UL-reference TDD UL/DL configuration may be selected from the existing TDD UL/DL configurations, as described below in connection with FIG. 2.

In another implementation, the first TDD UL/DL configuration 128b may be used as the DL-reference TDD UL/DL configuration, and the second TDD UL/DL configuration may be used as the UL-reference TDD UL/DL configuration. In yet another implementation, the first TDD UL/DL configuration 128b may be used as the UL-reference TDD UL/DL configuration, and the second TDD UL/DL configuration may be used as the DL-reference TDD UL/DL configuration.

In another scenario, the secondary configuration information 130b may include two extra TDD UL/DL configurations, which may be a second TDD UL/DL configuration and a third TDD UL/DL configuration. In one approach, only the secondary TDD UL/DL configurations (e.g., the second and third TDD UL/DL configurations) are used to determine the reference TDD UL/DL configurations, as described in FIG. 2. In another approach, the primary and both of the two secondary TDD UL/DL configurations are used to determine the reference TDD UL/DL configurations, as described in FIG. 2.

The eNB operations module 182 may provide information 190 to the one or more receivers 178. For example, the eNB operations module 182 may inform the receiver(s) 178 when or when not to receive PDSCH HARQ-ACK information based on the set of downlink subframe associations corresponding to the DL-reference TDD UL/DL configuration.

The eNB operations module 182 may provide information 188 to the demodulator 172. For example, the eNB operations module 182 may inform the demodulator 172 of a modulation pattern anticipated for transmissions from the UE(s) 102. In some implementations, this may be based on the DL-reference TDD UL/DL configuration and/or the UL-reference TDD UL/DL configuration.

The eNB operations module 182 may provide information 186 to the decoder 166. For example, the eNB operations module 182 may inform the decoder 166 of an anticipated encoding for transmissions from the UE(s) 102. In some implementations, this may be based on the DL-reference TDD UL/DL configuration and/or the UL-reference TDD UL/DL configuration.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101. In some implementations, this may be based on the DL-reference TDD UL/DL configuration and/or the UL-reference TDD UL/DL configuration.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a DL-reference TDD UL/DL configuration. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated (LSI) circuit or integrated circuit, etc.

Figure 2:
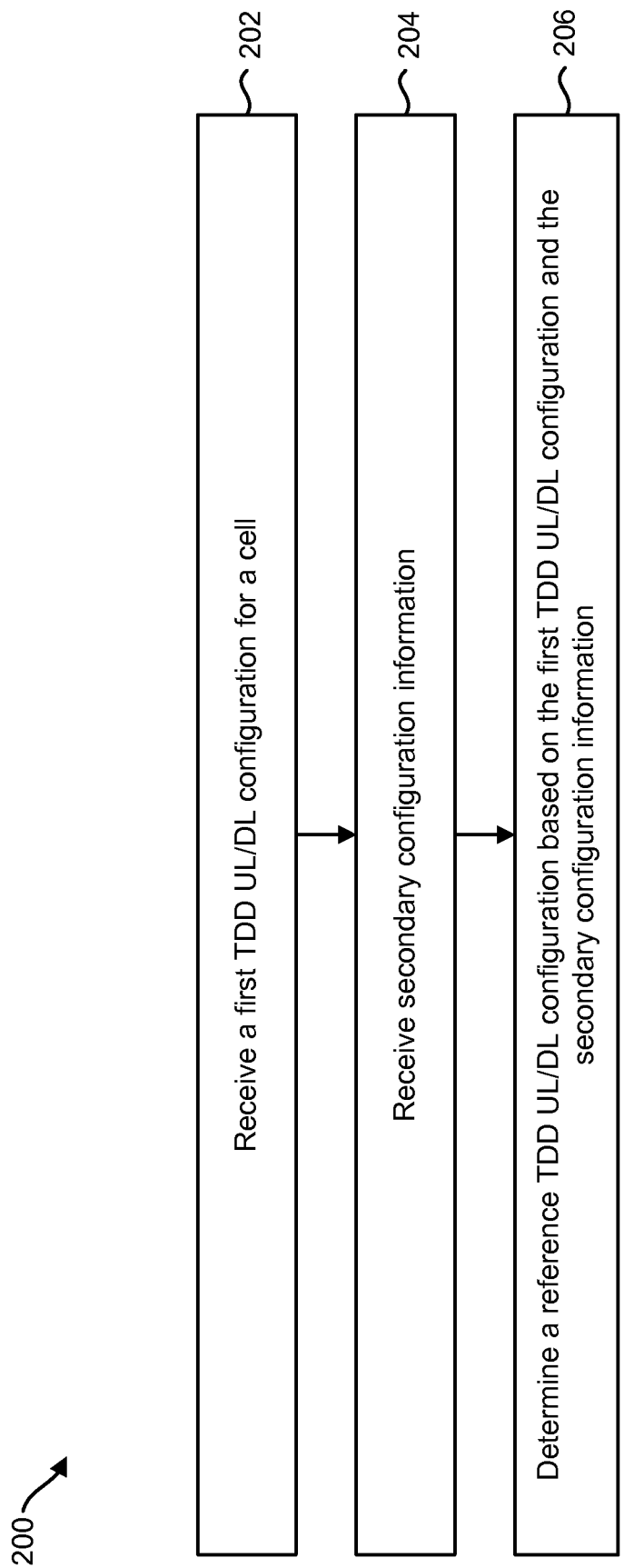
FIG. 2 is a flow diagram illustrating one implementation of a method 200 for configuration signaling by a UE.

FIG. 2 is a flow diagram illustrating one implementation of a method 200 for configuration signaling by a UE 102. The UE 102 may be configured with dynamic TDD UL/DL reconfiguration support (e.g., eIMTA support). The UE 102 may receive 202 a first TDD UL/DL configuration 128 for a cell. The cell may be a dynamic TDD UL/DL reconfiguration cell (e.g., an eIMTA cell).

A dynamic TDD UL/DL reconfiguration cell may be used as a primary serving cell (PCell) or a secondary serving cell (SCell). Different TDD UL/DL configuration signaling methods may be employed for an eIMTA PCell and an eIMTA SCell. As described above, a serving cell may be a cell of which the UE 102 is aware and is allowed by an eNB 160 to transmit or receive information. The UE 102 may receive 202 signaling to configure the UE 102 with the serving cell from an eNB 160. The signaling may indicate the first TDD UL/DL configuration 128 for the serving cell.

The first TDD UL/DL configuration 128 may be the default TDD UL/DL configuration for the cell. The first TDD UL/DL configuration 128 may also be referred to as a primary TDD UL/DL configuration. The first TDD UL/DL configuration 128 may be signaled as in Release-8, 9, 10 and 11. For example, in a Release-8, 9, 10 and 11 TDD cell, only one TDD UL/DL configuration is configured. The first TDD UL/DL configuration 128 may be signaled by a tdd-Config information element (IE) as in Release-8, 9, 10 and 11 for a PCell.

In one implementation, if the cell is a PCell, the UE 102 may receive 202 the first TDD UL/DL configuration 128 in a tdd-Config field in a SystemInformationBlockType1 (SIB1) block, which may be used to signal the first TDD UL/DL configuration 128 of the dynamic TDD UL/DL reconfiguration cell. The first TDD UL/DL configuration 128 may be used as the default TDD UL/DL configuration for dynamic TDD UL/DL reconfiguration supported UEs 102. For legacy UEs 102, the first TDD UL/DL configuration 128 is the only TDD UL/DL configuration. An example of signaling the first TDD UL/DL configuration 128 in an SIB is illustrated in Listing (1).

| Listing (1) |
|---|
| ```
-- ASN1START
SystemInformationBlockType1 ::=      SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity        OPTIONAL
            --Need OR
    },
    cellSelectionInfo                    SEQUENCE {
        q-RxLevMin                           Q-RxLevMin,
        q-RxLevMinOffset                     INTEGER (1..8)      OPTIONAL
            --Need OP
    },
    p-Max                                P-Max               OPTIONAL,
        --Need OP
    freqBandIndicator                    FreqBandIndicator,
    schedulingInfoList                   SchedulingInfoList,
    tdd-Config                           TDD-Config          OPTIONAL,
        -- Cond TDD
    si-WindowLength                      ENUMERATED {
                                            ms1, ms2, ms5, ms10, ms15,
                                            ms20, ms40},
    systemInfoValueTag                   INTEGER (0..31),
    nonCriticalExtension                 SystemInformationBlockType1-v890-IEs
        OPTIONAL
}
SystemInformationBlockType1-v890-IEs::=   SEQUENCE {
    lateNonCriticalExtension                OCTET STRING (CONTAINING
            SystemInformationBlockType1-v8h0-IEs)    OPTIONAL, -- Need OP
    nonCriticalExtension                    SystemInformationBlockType1-v920-IEs
        OPTIONAL
}
SystemInformationBlockType1-v8h0-IEs ::=SEQUENCE {
    multiBandInfoList                       MultiBandInfoList   OPTIONAL,
        -- Need OR
    nonCriticalExtension                    SEQUENCE { }        OPTIONAL
        -- Need OP
}
SystemInformationBlockType1-v920-IEs ::=SEQUENCE {
    ims-EmergencySupport-r9                 ENUMERATED {true}   OPTIONAL,
        -- Need OR
    cellSelectionInfo-v920                  CellSelectionInfo-v920  OPTIONAL,
        -- Cond RSRQ
    nonCriticalExtension                    SystemInformationBlockType1-v11xy-IEs
        OPTIONAL
}
SystemInformationBlockType1-v11xy-IEs ::=      SEQUENCE {
    tdd-Config-v11xy                        TDD-Config-v11xy    OPTIONAL,
        -- Cond TDD-OR
    nonCriticalExtension                    SEQUENCE { }        OPTIONAL
        -- Need OP
}
PLMN-IdentityList ::=                   SEQUENCE (SIZE (1..6)) OF PLMN-
    IdentityInfo
PLMN-IdentityInfo ::=                SEQUENCE {
    plmn-Identity                        PLMN-Identity,
    cellReservedForOperatorUse           ENUMERATED {reserved, notReserved}
``` |

Listing (1)

```
}
SchedulingInfoList ::= SEQUENCE (SIZE (1..maxSI-Message)) OF SchedulingInfo
SchedulingInfo ::=              SEQUENCE {
    si-Periodicity                   ENUMERATED {
                                         rf8, rf16, rf32, rf64,
                                         rf128, rf256, rf512},
    sib-MappingInfo                  SIB-MappingInfo
}
SIB-MappingInfo ::= SEQUENCE (SIZE (0..maxSIB-1)) OF SIB-Type
SIB-Type ::=                         ENUMERATED {
                                         sibType3, sibType4, sibType5,
                                         sibType6, sibType7, sibType8,
                                         sibType9, sibType10, sibType11,
                                         sibType12-v920, sibType13-v920,
                                         sibType14-v11xy, sibType15-
                                         v11x0,sibType16-v11x0, spare2,
                                         spare1, ...}
CellSelectionInfo-v920 ::=      SEQUENCE {
    q-QualMin-r9                     Q-QualMin-r9,
    q-QualMinOffset-r9               INTEGER (1..8)    OPTIONAL
            -- Need OP
}
-- ASN1STOP
```

In Listing (1), the TDD-config IE (denoted in bold text) may be used to specify a first TDD UL/DL configuration 128 for the PCell. cellBarred may indicate whether the cell is barred (as defined in 3GPP TS 36.304). cellReservedForOperatorUse may be used (as defined in 3GPP TS 36.304).

csg-Identity may indicate the identity of the Closed Subscriber Group (CSG) the cell belongs to. If csg-Indication is set to TRUE, the UE 102 is only allowed to access the cell if it is a CSG member cell, if selected during manual CSG selection or to obtain limited service.

ims-EmergencySupport may indicate whether the cell supports IMS emergency bearer services for UEs 102 in limited service mode. If ims-EmergencySupport is absent, IMS emergency call is not supported by the network in the cell for UEs 102 in limited service mode.

intraFreqReselection may be used to control cell reselection to intra-frequency cells when the highest ranked cell is barred, or treated as barred by the UE 102, (as specified in 3GPP TS 36.304).

multiBandInfoList may be a list of additional frequency band indicators (as defined in 3GPP TS 36.101, table 5.5-1) that the cell belongs to. If the UE 102 supports the frequency band in the freqBandIndicator IE, then the UE 102 may apply that frequency band. Otherwise, the UE 102 may apply the first listed band which it supports in the multiBandInfoList IE.

plmn-IdentityList may be a list of PLMN identities. The first listed PLMN-Identity may be the primary PLMN.

p-Max may be a value applicable for the cell. If absent the UE 102 may apply the maximum power according to the UE 102 capability.

q-QualMin may be the parameter "$Q_{qualmin}$" (as defined in 3GPP TS 36.304). If cellSelectionInfo-v920 is not present, then the UE 102 may apply the (default) value of negative infinity for $Q_{qualmin}$.

q-QualMinOffset may be the parameter "$Q_{qualminoffset}$" (as defined in 3GPP TS 36.304). The actual value of $Q_{qualminoffset}$=IE value [dB]. If cellSelectionInfo-v920 is not present or the field is not present, then the UE 102 may apply the (default) value of 0 dB for $Q_{qualminoffset}$. q-QualMinOffset may affect the minimum required quality level in the cell.

q-RxLevMinOffset may be the parameter "$Q_{rxlevminoffset}$" (as defined in 3GPP TS 36.304). The actual value of $Q_{rxlevminoffset}$=IE value*2 [dB]. If absent, the UE 102 may apply the (default) value of 0 dB for $Q_{rxlevminoffset}$. q-RxLevMinOffset may affect the minimum required reception level in the cell.

sib-MappingInfo may be a list of the SIBs mapped to this SystemInformation message. There is no mapping information of SIB2; it is always present in the first SystemInformation message listed in the schedulingInfoList list.

si-Periodicity may be the periodicity of the system information (SI)-message in radio frames. An rf8 may denote 8 radio frames, rf16 may denote 16 radio frames, and so on.

si-WindowLength may be the common SI scheduling window for all SIs. The si-WindowLength may have a unit in milliseconds, where ms1 denotes 1 millisecond, ms2 denotes 2 milliseconds, and so on.

systemInfoValueTag may be the common for all SIBs, other than master information block (MIB), SIB1, SIB10, SIB11, SIB12 and SIB14. A change of MIB and SIB1 may be detected by acquisition of the corresponding message. trackingAreaCode may be a trackingAreaCode that is common for all the PLMNs listed.

The following terms may indicate a conditional presence in Listing (1). RSRQ indicates that the presence of a field is mandatory if SIB3 is being broadcast and threshServingLowQ is present in SIB3. Otherwise, the field is optionally present (e.g., Need OP).

TDD indicates that the presence of a field is mandatory for TDD. It is not present for frequency-division duplexing (FDD) and the UE 102 may delete any existing value for this field.

TDD-OR indicates that the presence of a field is optional for TDD (e.g., Need OP). It is not present for FDD.

The TDD-config IE may specify the TDD-specific physical channel configuration. This may be accomplished as illustrated in Listing (2).

Listing (2)

```
-- ASN1START
TDD-Config ::=          SEQUENCE {
   subframeAssignment           ENUMERATED {
                                   sa0, sa1, sa2, sa3,
                                   sa4, sa5, sa6},
   specialSubframePatterns      ENUMERATED {
                                   ssp0, ssp1, ssp2, ssp3,
                                   ssp4, ssp5, ssp6, ssp7,
                                   ssp8}
}
TDD-Config-v11xy ::=    SEQUENCE {
   specialSubframePatterns-v11xy   ENUMERATED {ssp7,ssp9}
}
-- ASN1STOP
```

In Listing (2), specialSubframePatterns may indicate a configuration (as in 3GPP TS 36.211, table 4.2-1). ssp0 points to configuration 0, ssp1 points to configuration 1, etc.

specialSubframePatterns-v11xy may indicate special subframe patterns (as in 3GPP TS 36.211, table 4.2-1). The value ssp9 points to configuration 9 for normal cyclic prefix and it can only be present if the value of specialSubframePatterns is set to ssp5. And the value ssp7 points to configuration 7 for extended cyclic prefix and it can only be present if the value of specialSubframePatterns is set to ssp4. When the specialSubframePatterns-v11xy IE is present, values of specialSubframePatterns in TDD-config (without suffix) (e.g., the version defined in Release-8) may be ignored.

subframeAssignment may indicate a UL/DL subframe configuration where sa0 points to configuration 0, sa1 to configuration 1, etc. (as specified in 3GPP TS 36.211, table 4.2-2). One value may apply for all serving cells residing on same frequency band.

In another implementation, if the cell is a PCell configured with dynamic TDD UL/DL reconfiguration, the UE 102 may receive 202 the first TDD UL/DL configuration 128 in a radio resource control (RRC) common message. For example, a tdd-Config field in a RRC common (e.g., RadioResourceConfigCommon) block may be used to indicate the first TDD UL/DL configuration 128 of the cell. An example of signaling the first TDD UL/DL configuration 128 in an RRC common block is illustrated in Listing (3).

Listing (3)

```
RadioResourceConfigCommon ::=   SEQUENCE {
   rach-ConfigCommon                RACH-ConfigCommon
        OPTIONAL,   -- Need ON
   prach-Config                     PRACH-Config,
   pdsch-ConfigCommon               PDSCH-ConfigCommon
        OPTIONAL,   -- Need ON
   pusch-ConfigCommon               PUSCH-ConfigCommon,
   phich-Config                     PHICH-Config
        OPTIONAL,   -- Need ON
   pucch-ConfigCommon               PUCCH-ConfigCommon
        OPTIONAL,   -- Need ON
   soundingRS-UL-ConfigCommon       SoundingRS-UL-
                                    ConfigCommon
        OPTIONAL,   -- Need ON
   uplinkPowerControlCommon         UplinkPowerControl-
                                    Common
        OPTIONAL,   -- Need ON
   antennaInfoCommon                AntennaInfoCommon
        OPTIONAL,   -- Need ON
   p-Max                            P-Max    OPTIONAL,
        -- Need OP
   tdd-Config                       TDD-Config OPTIONAL,
        -- Cond TDD
   ul-CyclicPrefixLength            UL-CyclicPrefixLength,
   ...,
```

Listing (3)
-continued

```
   [[ uplinkPowerControlCommon-v1020 UplinkPowerControlCommon-
      v1020
             OPTIONAL   -- Need ON
   ]],
   [[ tdd-Config-v11xy                      TDD-Config-v11xy
             OPTIONAL   -- Cond TDD2
   ]]
}
```

In Listing (3), the TDD-config IE (denoted in bold text) may be used to indicate a first TDD UL/DL configuration 128 for the PCell. additionalSpectrumEmissionSCell may indicate the UE 102 requirements related to IE AdditionalSpectrumEmissionSCell (as defined in 3GPP TS 36.101).

defaultPagingCycle may be the default paging cycle, used to derive "T" (as in 3GPP TS 36.304). The value rf32 corresponds to 32 radio frames, rf64 corresponds to 64 radio frames, and so on.

modificationPeriodCoeff may be the actual modification period, expressed in number of radio frames=modificationPeriodCoeff*defaultPagingCycle. n2 corresponds to value 2, n4 corresponds to value 4, n8 corresponds to value 8 and n16 corresponds to value 16.

The parameter nB may be used as one of parameters to derive the Paging Frame and Paging Occasion (according to 3GPP TS 36.304). The value may be in multiples of "T" (as defined in 3GPP TS 36.304). A value of fourT corresponds to 4*T, a value of twoT corresponds to 2*T, and so on.

ul-Bandwidth may be a parameter associated with transmission bandwidth configuration, NRB, in uplink (as described in 3GPP TS 36.101, table 5.6-1). The value n6 corresponds to 6 resource blocks, n15 corresponds to 15 resource blocks, and so on. If for FDD this parameter is absent, the uplink bandwidth is equal to the downlink bandwidth. For TDD, this parameter is absent and it is equal to the downlink bandwidth.

For FDD, if ul-CarrierFreq is absent, the (default) value determined from the default transmission-reception (TX-RX) frequency separation (defined in 3GPP TS 36.101, table 5.7.3-1) applies. For TDD, ul-CarrierFreq is absent and it is equal to the downlink frequency.

UL-CyclicPrefixLength is a parameter that may indicate the uplink cyclic prefix length (as described in 3GPP TS 36.211, 5.2.1). The value len1 corresponds to normal cyclic prefix and len2 corresponds to extended cyclic prefix.

The following terms may indicate a conditional presence in Listing (3). TDD indicates that the presence of a field is optional for TDD (Need ON). It is not present for FDD and the UE 102 may delete any existing value for this field.

TDD2 indicates that the presence of a field is optional if tdd-Config-r10 is present (Need OR). Otherwise, the field is not present and the UE 102 may delete any existing value for this field.

TDD-OR-NoR11 indicates that the presence of a field is optional for TDD if prach-ConfigSCell-r11 is absent (Need OR). Otherwise, the field is not present and the UE 102 may delete any existing value for this field.

TDDSCell indicates that the presence of a field is mandatory for TDD. It is not present for FDD and the UE 102 may delete any existing value for this field.

UL indicates that the presence of a field is optional if the SCell is part of the secondary TAG and if ul-Configuration is included (Need OR). Otherwise, the field is not present and the UE 102 may delete any existing value for this field.

If a dynamic TDD UL/DL reconfiguration cell is an SCell, the UE 102 may also receive 202 the first TDD UL/DL configuration 128 in an RRC common message. For example, a tdd-Config-r10 field in an RRC common message may be used to indicate the first TDD UL/DL configuration 128 of the eIMTA SCell. In one implementation, the RRC common message may be a RadioResourceConfigCommonSCell-r10 message as illustrated in Listing (4).

| Listing (4) |
|---|
| RadioResourceConfigCommonSCell-r10 ::= SEQUENCE { <br>   -- DL configuration as well as configuration applicable for DL and UL <br>   nonUL-Configuration-r10            SEQUENCE { <br>     -- 1: Cell characteristics <br>     dl-Bandwidth-r10                 ENUMERATED {n6, n15, n25, n50, n75, n100}, <br>     -- 2: Physical configuration, general <br>     antennaInfoCommon-r10          AntennaInfoCommon, <br>     mbsfn-SubframeConfigList-r10    MBSFN-SubframeConfigList <br>         OPTIONAL, -- Need OR <br>     -- 3: Physical configuration, control <br>     phich-Config-r10                PHICH-Config, <br>     -- 4: Physical configuration, physical channels <br>     pdsch-ConfigCommon-r10         PDSCH-ConfigCommon, <br>     tdd-Config-r10                TDD-Config         OPTIONAL <br>         -- Cond TDDSCell <br>   }, <br>   -- UL configuration <br>   ul-Configuration-r10              SEQUENCE { <br>     ul-FreqInfo-r10                 SEQUENCE { <br>       ul-CarrierFreq-r10          ARFCN-ValueEUTRA <br>         OPTIONAL, -- Need OP <br>       ul-Bandwidth-r10            ENUMERATED {n6, n15, n25, n50, n75, <br>                                           n100}   OPTIONAL, -- Need OP <br>     additionalSpectrumEmissionSCell-r10    AdditionalSpectrumEmission <br>     }, <br>     p-Max-r10                       P-Max        OPTIONAL, -- Need OP <br>     uplinkPowerControlCommonSCell-r10 <br>       uplinkPowerControlCommonSCell-r10, <br>     -- A special version of IE UplinkPowerControlCommon may be introduced <br>     -- 3: Physical configuration, control <br>     soundingRS-UL-ConfigCommon-r10       SoundingRS-UL-ConfigCommon, <br>     ul-CyclicPrefixLength-r10            UL-CyclicPrefixLength, <br>     -- 4: Physical configuration, physical channels <br>     prach-ConfigSCell-r10           PRACH-ConfigSCell-r10 <br>         OPTIONAL, -- Cond TDD-OR-NoR11 <br>     pusch-ConfigCommon-r10          PUSCH-ConfigCommon <br>   }                                                        OPTIONAL, -- Need OR <br>   ..., <br>   [[ rach-ConfigCommonSCell-r11        RACH-ConfigCommonSCell-r11 <br>         OPTIONAL, -- Cond UL <br>     prach-ConfigSCell-r11            PRACH-Config <br>         OPTIONAL, -- Cond UL <br>     tdd-Config-v11xy                TDD-Config-v11xy <br>         OPTIONAL, -- Cond TDD2 <br>     uplinkPowerControlCommonSCell-v11x0 <br>       UplinkPowerControlCommonSCell-v11x0       OPTIONAL -- Cond UL <br>   ]] <br> } |

In Listing (4), the tdd-config-r10 IE (denoted in bold text) may be used to indicate a first TDD UL/DL configuration for the SCell. The additional terms included in Listing (4) may be defined as described in connection with Listing (3).

The UE 102 may receive 204 secondary configuration information 130 for the cell. The secondary configuration information 130 may be received 204 from an eNB 160. In one implementation, the UE 102 may receive 204 the secondary configuration information 130 in the same message (e.g., SIB or RRC) as the first TDD UL/DL configuration 128. In another implementation, the UE 102 may receive 204 the secondary configuration information 130 in a separate message (e.g., SIB or RRC) as the first TDD UL/DL configuration 128. Furthermore, the secondary configuration information 130 may be received 204 in a single message, or in multiple messages.

In some implementations, the secondary configuration information 130 may include an allowed TDD UL/DL reconfiguration range. The TDD UL/DL reconfiguration range may be a set of TDD UL/DL configurations, or any states between two TDD UL/DL configurations. As used herein, a state may be another TDD UL/DL configuration that is included in the TDD UL/DL reconfiguration range. For example, if the TDD UL/DL reconfiguration range is TDD UL/DL configuration 2 (5 millisecond (ms) periodicity with 2 UL in a radio frame) and TDD UL/DL configuration 0 (5 ms periodicity with 6 UL in a radio frame), TDD UL/DL configuration 1 (5 ms periodicity with 4 UL in a radio frame) and TDD UL/DL configuration 6 (5 ms periodicity with 5 UL in a radio frame) may be intermediate states in the TDD UL/DL reconfiguration range. Therefore, the cell may be configured with multiple TDD UL/DL configurations.

In one implementation, in addition to the first TDD UL/DL configuration 128, at least a second TDD UL/DL configuration may be configured for the dynamic TDD UL/DL reconfiguration cell. In another implementation, a second TDD UL/DL configuration and a third TDD UL/DL configuration may be configured in addition to the first TDD UL/DL configuration 128. The second TDD UL/DL configuration and the third TDD UL/DL configuration of the dynamic TDD UL/DL reconfiguration cell may be defined as secondary TDD UL/DL configurations of the dynamic TDD UL/DL reconfiguration cell. Therefore, a dynamic TDD UL/DL reconfiguration cell may be configured with one primary TDD UL/DL configuration and one or two secondary TDD UL/DL configurations.

The UE 102 may receive 204 the secondary configuration information 130 in a secondary TDD configuration IE. For example, a new secondary TDD configuration IE may be defined for a dynamic TDD UL/DL reconfiguration cell. The secondary TDD configuration IE may be a TDD-Config-r12 IE. The secondary TDD configuration IE may include one or two secondary TDD UL-DL configurations.

In one implementation, the secondary TDD UL/DL configurations may be included in the secondary TDD configuration IE. For example, the secondary TDD configuration IE may include an index corresponding to the secondary TDD UL/DL configurations. The special subframe configuration in a dynamic TDD UL/DL reconfiguration cell should be the same as the first (e.g., primary or default) TDD UL/DL configuration 128. Therefore, the special subframe configuration field may be removed from the settings (e.g., the signaling). Furthermore, each TDD-config field in the secondary TDD configuration IE needs 3 bits, and 6 bits are needed to indicate two extra TDD UL/DL configurations (e.g., the secondary TDD UL/DL configurations). For one extra TDD UL/DL configuration, the secondary TDD configuration IE (e.g., the TDD-Config-r12 IE) may be defined as illustrated in Listing (5).

---
Listing (5)
---
TDD-Config-r12 ::= SEQUENCE {
   Extra-TDD-Config1          ENUMERATED {
                                     sa0, sa1, sa2, sa3, sa4, sa5, sa6}
                                     OPTIONAL
}

In Listing (5), Extra-TDD-Config1 may represent the extra TDD UL/DL configuration (e.g., the second TDD UL/DL configuration). Extra-TDD-Config1 may be one of seven values (e.g., sa0, sa1, sa2, sa3, sa4, sa5 or sa6).

The secondary TDD configuration IE may also indicate two extra TDD UL/DL configurations. For example, for one or two extra TDD UL/DL configurations, the secondary TDD configuration IE (e.g., the TDD-Config-r12 IE) may be defined as illustrated in Listing (6).

---
Listing (6)
---
TDD-Config-r12 ::= SEQUENCE {
   Extra-TDD-Config1       ENUMERATED {
                               sa0, sa1, sa2, sa3, sa4, sa5, sa6}
                               OPTIONAL
   Extra-TDD-Config2       ENUMERATED {
                               sa0, sa1, sa2, sa3, sa4, sa5, sa6}
                               OPTIONAL
}

In Listing (6), Extra-TDD-Config2 may represent the second extra TDD UL/DL configuration (e.g., the third TDD UL/DL configuration). Extra-TDD-Config2 may be one of seven values (e.g., sa0, sa1, sa2, sa3, sa4, say or sa6).

In another implementation, all combinations of different TDD UL/DL configurations may be enumerated in a table of combinations of TDD UL/DL configurations. An index of the combinations of TDD UL/DL configurations (e.g., the table entries) may be used to indicate the allowed TDD UL/DL reconfiguration range.

In one approach, the order of the TDD UL/DL configurations is not considered. Therefore, a total of 21 combinations of different TDD UL/DL configurations are possible, as illustrated in Table (1).

TABLE (1)

| Index | TDD UL/DL Configurations | Flexible Subframes |
|---|---|---|
| 0 | {0, 1} | 4, 9 |
| 1 | {0, 2} | 3, 4, 8, 9 |
| 2 | {0, 3} | 7, 8, 9 |
| 3 | {0, 4} | 4, 7, 8, 9 |
| 4 | {0, 5} | 3, 4, 7, 8, 9 |
| 5 | {0, 6} | 9 |
| 6 | {1, 2} | 3, 8 |
| 7 | {1, 3} | 4, 7, 8 |
| 8 | {1, 4} | 7, 8 |
| 9 | {1, 5} | 3, 7, 8 |
| 10 | {1, 6} | 4 |
| 11 | {2, 3} | 3, 4, 7 |
| 12 | {2, 4} | 3, 7 |
| 13 | {2, 5} | 7 |
| 14 | {2, 6} | 3, 4, 8 |
| 15 | {3, 4} | 4 |
| 16 | {3, 5} | 3, 4 |
| 17 | {3, 6} | 7, 8 |
| 18 | {4, 5} | 3 |
| 19 | {4, 6} | 4, 7, 8 |
| 20 | {5, 6} | 3, 4, 7, 8 |

Table (1) also shows the relationship between the combination of TDD UL/DL configurations and flexible subframes. This relationship may be applied to any methods of above and below.

In a second approach, the order of the TDD UL/DL configurations is considered. Therefore, a total of 42 combinations different TDD UL/DL configurations are possible, as illustrated in Table (2).

TABLE (2)

| Index | TDD UL/DL Configurations | Index | TDD UL/DL Configurations |
|---|---|---|---|
| 0 | {0, 1} | 1 | {1, 0} |
| 2 | {0, 2} | 3 | {2, 0} |
| 4 | {0, 3} | 5 | {3, 0} |
| 6 | {0, 4} | 7 | {4, 0} |
| 8 | {0, 5} | 9 | {5, 0} |
| 10 | {0, 6} | 11 | {6, 0} |
| 12 | {1, 2} | 13 | {2, 1} |
| 14 | {1, 3} | 15 | {3, 1} |
| 16 | {1, 4} | 17 | {4, 1} |
| 18 | {1, 5} | 19 | {5, 1} |
| 20 | {1, 6} | 21 | {6, 1} |
| 22 | {2, 3} | 23 | {3, 2} |
| 24 | {2, 4} | 25 | {4, 2} |
| 26 | {2, 5} | 27 | {5, 2} |
| 28 | {2, 6} | 29 | {6, 2} |
| 30 | {3, 4} | 31 | {4, 3} |
| 32 | {3, 5} | 33 | {5, 3} |
| 34 | {3, 6} | 35 | {6, 3} |
| 36 | {4, 5} | 37 | {5, 4} |
| 38 | {4, 6} | 39 | {6, 4} |
| 40 | {5, 6} | 41 | {6, 5} |

The table of combinations of different TDD UL/DL configurations (e.g., Table (1) and Table (2)) may also be referred to as a TDD eIMTA reconfiguration table. The secondary TDD configuration IE (e.g., TDD-Config-r12 IE) may indicate the index of combinations of TDD UL/DL configurations as illustrated in Listing (7).

Listing (7)

```
TDD-Config-r12 ::=          SEQUENCE {
    TDD-Config-Combination  index of the table of combinations
        OPTIONAL
}
```

In Listing (7), TDD-Config-Combination represents a combination of TDD UL/DL configurations. The value of TDD-Config-Combination may be one of the index values from Table (1) or Table (2).

To signal the secondary configuration information 130 (e.g., the secondary TDD UL/DL configurations or eIMTA reconfiguration range), the secondary TDD configuration IE (e.g., the TDD-Config-r12 IE) may be included in the SIB1 and/or RRC signaling. Different TDD UL/DL configuration signaling methods may be employed for a dynamic TDD UL/DL reconfiguration PCell and a dynamic TDD UL/DL reconfiguration SCell.

If a dynamic TDD UL/DL reconfiguration cell is a PCell, the secondary configuration information 130 (e.g., secondary TDD UL/DL configurations) may be signaled in an SIB. For example, the secondary TDD UL/DL configurations may be signaled as a nonCriticalExtension in SystemInformationBlockType1 message by a tdd-Config-r12 field using the TDD-Config-r12 IE defined above. The tdd-Config-r12 may be signaled as illustrated in Listing (8). The conditional presence TDD-eIMTA means that the field is optional, and is applicable for a TDD eIMTA cell only.

Listing (8)

```
SystemInformationBlockType1-v12-1Es ::= SEQUENCE {
    tdd-Config-r12              TDD-Config-r12   OPTIONAL,
        -- Cond TDD-eIMTA
    nonCriticalExtension        SEQUENCE { }     OPTIONAL
        -- Need OP
}
```

If a dynamic TDD UL/DL reconfiguration cell is a PCell, the secondary configuration information 130 (e.g., the secondary TDD UL/DL configurations) may also be signaled by adding an extension tdd-Config-r12 field in an RRC block (e.g., RadioResourceConfigCommon), as illustrated in Listing (9). The RRC common message signaling of the secondary configuration information 130 may be used independently or together with the SIB1 signaling. In Listing (9), the tdd-Config-r12 IE (denoted in bold text) may be used to specify the secondary configuration information 130 for the PCell. The conditional presence TDD-eIMTA means that the field is optional, and is applicable for a TDD eIMTA cell only.

Listing (9)

```
RadioResourceConfigCommon ::=   SEQUENCE {
    rach-ConfigCommon               RACH-ConfigCommon
        OPTIONAL,     -- Need ON
    prach-Config                    PRACH-Config,
    pdsch-ConfigCommon              PDSCH-ConfigCommon
        OPTIONAL,     -- Need ON
    pusch-ConfigCommon              PUSCH-ConfigCommon,
    phich-Config                    PHICH-Config
        OPTIONAL,     -- Need ON
    pucch-ConfigCommon              PUCCH-ConfigCommon
        OPTIONAL,     -- Need ON
    soundingRS-UL-ConfigCommon      SoundingRS-UL-
                                    ConfigCommon
        OPTIONAL,     -- Need ON
    uplinkPowerControlCommon        UplinkPowerControl-
                                    Common
        OPTIONAL,     -- Need ON
    antennaInfoCommon               AntennaInfoCommon
        OPTIONAL,     -- Need ON
    p-Max                           P-Max        OPTIONAL,
        -- Need OP
    tdd-Config                      TDD-Config   OPTIONAL,
        -- Cond TDD
    ul-CyclicPrefixLength           UL-CyclicPrefixLength,
    ...,
    [[ uplinkPowerControlCommon-
v1020 UplinkPowerControlCommon-v1020
        OPTIONAL    -- Need ON
    ]],
    [[ tdd-Config-v11xy             TDD-Config-v11xy
        OPTIONAL    -- Cond TDD2
    ]],
    [[ tdd-Config-r12               TDD-Config-r12
        OPTIONAL    -- Cond TDD eIMTA
    ]]
}
```

If a dynamic TDD UL/DL reconfiguration cell is an SCell, the secondary configuration information 130 (e.g., the secondary TDD UL/DL configurations) may be signaled by adding an extension tdd-Config-r12 field in an RRC block (e.g., RadioResourceConfigCommonSCell-r10), as illustrated in Listing (10).

Listing (10)

```
RadioResourceConfigCommonSCell-r10 ::= SEQUENCE {
    -- DL configuration as well as configuration applicable for DL and UL
    nonUL-Configuration-r10         SEQUENCE {
        -- 1: Cell characteristics
        dl-Bandwidth-r10                ENUMERATED {n6, n15, n25, n50, n75,
                                        n100},
        -- 2: Physical configuration, general
        antennaInfoCommon-r10           AntennaInfoCommon,
        mbsfn-SubframeConfigList-r10    MBSFN-SubframeConfigList
            OPTIONAL,    -- Need OR
        -- 3: Physical configuration, control
        phich-Config-r10                PHICH-Config,
        -- 4: Physical configuration, physical channels
        pdsch-ConfigCommon-r10          PDSCH-ConfigCommon,
```

-continued

Listing (10)

```
    tdd-Config-r10                        TDD-Config         OPTIONAL
            -- Cond TDDSCell
    },
    -- UL configuration
    ul-Configuration-r10                  SEQUENCE {
      ul-FreqInfo-r10                     SEQUENCE {
        ul-CarrierFreq-r10                ARFCN-ValueEUTRA
            OPTIONAL,   -- Need OP
        ul-Bandwidth-r10                  ENUMERATED {n6, n15, n25, n50, n75,
                                                      n100}   OPTIONAL, -- Need OP
        additionalSpectrumEmissionSCell-r10   AdditionalSpectrumEmission
      },
      p-Max-r10                           P-Max              OPTIONAL,   -- Need OP
      uplinkPowerControlCommonSCell-r10
            uplinkPowerControlCommonSCell-r10,
      -- A special version of IE UplinkPowerControlCommon may be introduced
      -- 3: Physical configuration, control
      soundingRS-UL-ConfigCommon-r10      SoundingRS-UL-ConfigCommon,
      ul-CyclicPrefixLength-r10           UL-CyclicPrefixLength,
      -- 4: Physical configuration, physical channels
      prach-ConfigSCell-r10               PRACH-ConfigSCell-r10
            OPTIONAL,   -- Cond TDD-OR-NoR11
      pusch-ConfigCommon-r10              PUSCH-ConfigCommon
    }                                                        OPTIONAL,   -- Need OR
    ...,
    [[ rach-ConfigCommonSCell-r11        RACH-ConfigCommonSCell-r11
            OPTIONAL,   -- Cond UL
       prach-ConfigSCell-r11              PRACH-Config
            OPTIONAL,   -- Cond UL
       tdd-Config-v11xy                   TDD-Config-v11xy
            OPTIONAL,   -- Cond TDD2
       uplinkPowerControlCommonSCell-v11x0
            UplinkPowerControlCommonSCell-v11x0    OPTIONAL   -- Cond UL
    ]],
    [[ tdd-Config-r12                     TDD-Config-r12
            OPTIONAL       -- Cond TDD eIMTA
    ]]
}
```

In Listing (10), the tdd-Config-r12 IE (denoted in bold text) may be used to specify the secondary configuration information 130 for the SCell. The conditional presence TDD-eIMTA means that the field is optional, and is applicable for a TDD eIMTA cell only. It should be noted that if the dynamic TDD UL/DL reconfiguration cell is an SCell, then an SIB is not used to signal the secondary configuration information 130 for the SCell.

Furthermore, it should be noted that the described configuration methods are backward compatible to legacy UEs 102. The legacy UEs 102 do not understand and will ignore the secondary TDD UL/DL configuration, and will use the cell as a legacy TDD cell configured with the first TDD UL/DL configuration 128. The new secondary TDD configuration IE defines the TDD UL/DL reconfiguration range for dynamic reconfiguration for eIMTA supported UEs.

The UE 102 may determine 206 the reference TDD UL/DL configurations based on the first TDD UL/DL configuration 128 and the secondary configuration information 130. The multiple configured TDD UL/DL configurations (e.g., the primary TDD UL/DL configuration and the one or two secondary TDD UL/DL configurations) define the TDD UL/DL reconfiguration ranges. Therefore, the multiple configured TDD UL/DL configurations also define the fixed and flexible subframes. A subframe that is allocated with the same setting as the configured TDD UL/DL configurations is a fixed subframe. A subframe that is allocated with a different setting than the configured TDD UL/DL configurations is a flexible subframe. A flexible subframe may be used as a DL subframe or a UL subframe. Therefore, the flexible subframes may be included in the association timing of PDSCH and PUSCH. The multiple configured TDD UL/DL configurations may be used to determine 206 the DL-reference TDD UL/DL configuration and the UL-reference TDD UL/DL configuration.

The DL-reference TDD UL/DL configuration may be used to perform PDSCH operations. For example, the DL-reference TDD UL/DL configuration may be used for PDSCH HARQ-ACK reporting timing, as indicated in Table (3) (from Table 10.1.3.1-1 of 3GPP TS 36.213). Table (3) provides the downlink association set index K: $\{k_0, k_1, \ldots k_{M-1}\}$ for TDD, where the "TDD UL/DL Configuration" refers to the DL-reference TDD UL/DL configuration.

TABLE (3)

| TDD UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |

TABLE (3)-continued

| TDD UL/DL Configuration | 0 | 1 | 2 | 3 | 4 | 5 | 6 | 7 | 8 | 9 |
|---|---|---|---|---|---|---|---|---|---|---|
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

The UE 102 may transmit the PDSCH HARQ-ACK response in a UL subframe n. For example, the UE 102 may detect a PDSCH transmission or a PDCCH and/or enhanced physical downlink control channel (EPDCCH) indicating downlink semi-persistent scheduling (SPS) release (as defined in section 9.2 of 3GPP TS 36.213) within subframe(s) n−k (where k∈K and K is defined in Table (3)) intended for the UE 102 and for which a HARQ-ACK response may be provided. The UE 102 may then transmit the HARQ-ACK response in the UL subframe n.

The UL-reference TDD UL/DL configuration may be used to perform PUSCH operations. For example, the UL-reference TDD UL/DL configuration may be used for PUSCH scheduling and PUSCH HARQ-ACK timing.

For a serving cell with an UL-reference TDD UL/DL configuration (defined in Section 8.0 of 3GPP TS 36.213) belonging to {1,2,3,4,5,6}, a HARQ-ACK received on the PHICH assigned to a UE 102 in subframe i may be associated with the PUSCH transmission in the subframe i−k for the serving cell as illustrated in Table (4) (from Table 8.3-1 of 3GPP TS 36.213), where the "TDD UL/DL Configuration" refers to the UL-reference TDD UL/DL configuration. Table (4) provides entries for k corresponding to a subframe number i and a UL-reference TDD UL/DL configuration 0-6.

TABLE (4)

| TDD UL/DL Configuration | 0 | 1 | 2 | 3 | 4 | 5 | 6 | 7 | 8 | 9 |
|---|---|---|---|---|---|---|---|---|---|---|
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

For a serving cell with UL-reference TDD UL/DL configuration 0 (defined in Section 8.0 of 3GPP TS 36.213), a HARQ-ACK received on the PHICH in the resource corresponding to $I_{PHICH}=0$ (as defined in Section 9.1.2 of 3GPP TS 36.213) assigned to a UE 102 in subframe i may be associated with the PUSCH transmission in the subframe i−k for the serving cell as in Table (4), where "TDD UL/DL Configuration" refers to the UL-reference TDD UL/DL configuration. For a serving cell with UL-reference TDD UL/DL configuration 0, a HARQ-ACK received on the PHICH in the resource corresponding to $I_{PHICH}=1$ (as defined in Section 9.1.2 of 3GPP TS 36.213) assigned to a UE 102 in subframe i is associated with the PUSCH transmission in the subframe i−6 for the serving cell.

In general, the DL-reference TDD UL/DL configuration may include all fixed DL subframes and flexible subframes as downlink. The UL-reference TDD UL/DL configuration may include all fixed UL subframes and flexible subframes as uplink. The DL-reference TDD UL/DL configuration may be derived based on the first (e.g., primary) TDD UL/DL configuration 128 and the secondary configuration information 130 (e.g., secondary TDD UL/DL configurations). The DL-reference TDD UL/DL configuration may be used for PDSCH HARQ-ACK timing of the dynamic TDD UL/DL reconfiguration cell. The UL-reference TDD UL/DL configuration may also be derived based on first TDD UL/DL configuration 128 and the secondary configuration information 130. The UL-reference TDD UL/DL configuration may be used for PUSCH scheduling and PUSCH HARQ-ACK timing of the dynamic TDD UL/DL reconfiguration cell.

The reference TDD UL/DL configurations (e.g., DL-reference and UL-reference TDD UL/DL configurations) may be determined 206 in different ways depending on whether the secondary configuration information 130 includes one or two secondary TDD UL/DL configurations. For example, the secondary configuration information 130 may include a second TDD UL/DL configuration for the cell. Alternatively, the secondary configuration information 130 may include a second TDD UL/DL configuration and a third TDD UL/DL configuration for the cell.

In one scenario, the secondary configuration information 130 may include one extra TDD UL/DL configuration for a dynamic TDD UL/DL reconfiguration cell. The secondary configuration information 130 may include only a second TDD UL/DL configuration for the cell. If only one TDD UL/DL configuration (e.g., the second TDD UL/DL configuration) is configured as the secondary TDD UL/DL configuration, the first TDD UL/DL configuration 128 and the second TDD UL/DL configuration may be used to determine 206 the DL-reference TDD UL/DL configuration and the UL-reference DL/DL configuration. In other words, the reference TDD UL/DL configurations may be determined based on the first TDD UL/DL configuration 128 and the second TDD UL/DL configuration.

In one implementation, the first TDD UL/DL configuration 128 and the second TDD UL/DL configuration may be any combination. The DL-reference TDD UL/DL configuration may include all fixed DL subframes and flexible subframes as downlink. In other words, the DL-reference TDD UL/DL configuration may be the TDD UL/DL configuration with overlapping UL subframes among the first TDD UL/DL configuration 128 and the second TDD UL/DL configuration.

Figure 6:
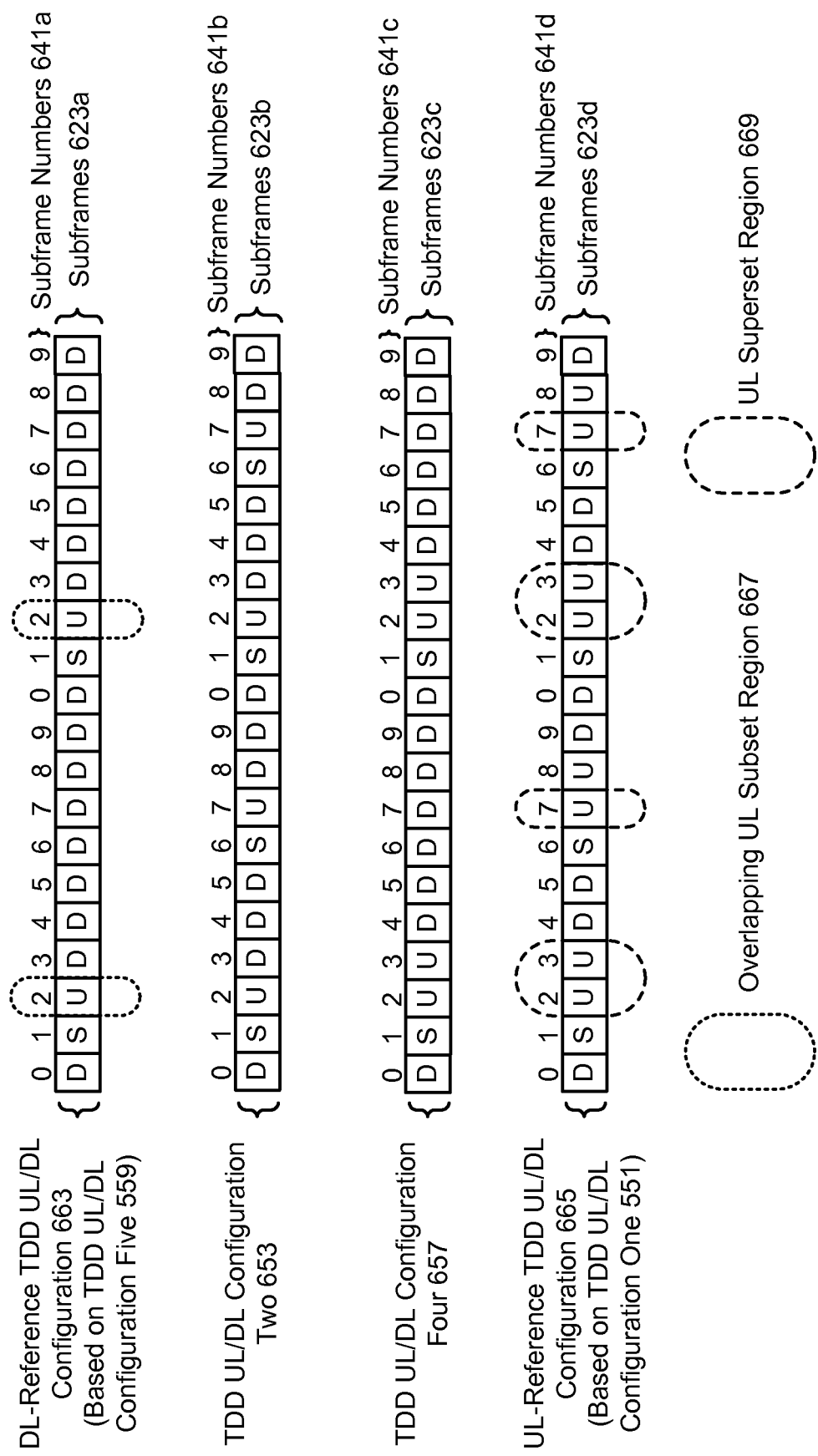
FIG. 6 is a diagram illustrating an example of determining a DL-reference TDD UL/DL configuration 663 and a UL-reference TDD UL/DL configuration.

The DL-reference TDD UL/DL configuration may be selected from the existing TDD UL/DL configurations. If the TDD UL/DL configuration with overlapping UL subframes among the first TDD UL/DL configuration 128 and the second TDD UL/DL configuration is not an existing standard TDD UL/DL configuration (0-6), the closest standard TDD UL/DL configuration with less UL allocations may be selected as the DL-reference TDD UL/DL configuration, as illustrated in FIG. 6. The DL-reference TDD UL/DL configuration may be the same as one of the first TDD UL/DL configuration 128 and the second TDD UL/DL configuration.

The DL-reference TDD UL/DL configuration may be different than both the first TDD UL/DL configuration 128 and the second TDD UL/DL configuration.

The UL-reference TDD UL/DL configuration should include all fixed UL subframes and flexible subframes as uplink. In other words, the UL-reference TDD UL/DL configuration may be the TDD UL/DL configuration with overlapping DL or special subframes among the first TDD UL/DL configuration 128 and the second TDD UL/DL configuration. The UL-reference TDD UL/DL configuration may also be the TDD UL/DL configuration with a superset of UL subframes among the first TDD UL/DL configuration 128 and the second TDD UL/DL configuration.

The UL-reference TDD UL/DL configuration may be selected from the existing TDD UL/DL configurations. If the TDD UL/DL configuration with overlapping DL or special subframes among the first TDD UL/DL configuration 128 and the second TDD UL/DL configuration is not an existing standard TDD UL/DL configuration (0-6), the closest standard TDD UL/DL configuration with more UL allocations may be selected as the UL-reference TDD UL/DL configuration, as illustrated in FIG. 6. The UL-reference TDD UL/DL configuration may be the same as one of the first TDD UL/DL configuration 128 and the second TDD UL/DL configuration. The UL-reference TDD UL/DL configuration may be different than both the first TDD UL/DL configuration 128 and the second TDD UL/DL configuration.

The DL-reference TDD UL/DL configuration and the UL-reference TDD UL/DL configuration are listed for all combinations of TDD UL/DL configurations in Table (5). For a flexible subframe, the direction of the first (e.g., primary) TDD UL/DL configuration 128 may be used as default unless a PHY layer signaling is signaled otherwise. Table (5) may be predefined regardless of how the table is generated and used by a UE 102 to determine 206 a DL-reference TDD UL/DL configuration and/or a UL-reference TDD UL/DL configuration.

TABLE (5)

| Index | Combinations of TDD UL/DL Configurations | DL-reference TDD UL/DL configuration | UL-reference TDD UL/DL configuration |
|---|---|---|---|
| 0 | {0, 1} or {1, 0} | 1 | 0 |
| 1 | {0, 2} or {2, 0} | 2 | 0 |
| 2 | {0, 3} or {3, 0} | 3 | 0 |
| 3 | {0, 4} or {4, 0} | 4 | 0 |
| 4 | {0, 5} or {5, 0} | 5 | 0 |
| 5 | {0, 6} or {6, 0} | 6 | 0 |
| 6 | {1, 2} or {2, 1} | 2 | 1 |
| 7 | {1, 3} or {3, 1} | 4 | 6 |
| 8 | {1, 4} or {4, 1} | 4 | 1 |
| 9 | {1, 5} or {5, 1} | 5 | 1 |
| 10 | {1, 6} or {6, 1} | 1 | 6 |
| 11 | {2, 3} or {3, 2} | 5 | 6 |
| 12 | {2, 4} or {2, 4} | 5 | 1 |
| 13 | {2, 5} or {5, 2} | 5 | 2 |
| 14 | {2, 6} or {6, 2} | 2 | 6 |
| 15 | {3, 4} or {4, 3} | 4 | 3 |
| 16 | {3, 5} or {5, 3} | 5 | 3 |
| 17 | {3, 6} or {6, 3} | 3 | 6 |
| 18 | {4, 5} or {5, 4} | 5 | 4 |
| 19 | {4, 6} or {6, 4} | 4 | 6 |
| 20 | {5, 6} or {6, 5} | 5 | 6 |

In another implementation, the order of the TDD UL/DL configurations is fixed, such that the first (e.g., primary) TDD UL/DL configuration 128 is used as the DL-reference TDD UL/DL configuration, and the second TDD UL/DL configuration is used as the UL-reference TDD UL/DL configuration. In this implementation, the eNB 160 should make sure there is no conflict between the TDD UL/DL configurations. Therefore, the DL subframes of the first UL/DL configuration 128 should be a superset of the DL subframes of the second UL/DL configurations, and the UL subframes of the first UL/DL configuration 128 should be a subset of the UL subframes of the second UL/DL configurations. For example, the first TDD UL/DL configuration 128 and the second TDD UL/DL configuration should be selected based on the DL-reference TDD UL/DL configuration and the UL-reference TDD UL/DL configuration listed in Table (5). Thus, not all combinations of TDD UL/DL configurations are supported.

In yet another implementation, the order of the TDD UL/DL configurations is fixed, such that the first (e.g., primary) TDD UL/DL configuration 128 is the UL-reference TDD UL/DL configuration, and the second TDD UL/DL configuration is the DL-reference TDD UL/DL configuration. In this implementation, the eNB 160 should make sure there is no conflict between the TDD UL/DL configurations. Therefore, the DL subframes of the first UL/DL configuration 128 should be a subset of the DL subframes of the second UL/DL configurations, and the UL subframes of the first UL/DL configuration 128 should be a superset of the UL subframes of the second UL/DL configurations. For example, the first TDD UL/DL configuration 128 and the second TDD UL/DL configuration should be selected based on the UL-reference TDD UL/DL configuration and the DL-reference TDD UL/DL configuration listed in Table (5). Thus, not all combinations of TDD UL/DL configurations are supported.

In another scenario, the secondary configuration information 130 may include two extra TDD UL/DL configurations for a dynamic TDD UL/DL reconfiguration cell. The two extra TDD UL/DL configurations may be the second TDD UL/DL configuration and the third TDD UL/DL configuration, which may be configured as the secondary TDD UL/DL configurations. In this scenario, there are several approaches to determine 206 the DL-reference TDD UL/DL configuration and the UL-reference TDD DL/DL configuration.

In one approach, only the secondary TDD UL/DL configurations are used to determine 206 the reference TDD UL/DL configurations. In other words, the reference TDD UL/DL configurations may be determined based on the second TDD UL/DL configuration and the third TDD UL/DL configuration. Table (5) may be used in which the combination of TDD UL/DL configurations is the two secondary UL-DL configurations. Under this approach, the primary TDD UL/DL configuration may be the same as one of the secondary TDD UL/DL configurations. Alternatively, the primary TDD UL/DL configuration may be different than the two secondary TDD UL/DL configurations. The primary TDD UL/DL configuration may be used to determine the default directions of a flexible subframe. There are three implementations to determine 206 the reference TDD UL/DL configurations based on the secondary TDD UL/DL configurations.

In one implementation, any combination of TDD UL/DL configurations is supported. The DL-reference TDD UL/DL configuration and the UL-reference TDD UL/DL configuration may be decided based on Table (5).

In another implementation, among the two secondary TDD UL/DL configurations (e.g., the second and third TDD UL/DL configurations), the order of the TDD UL/DL configurations is fixed. The second TDD UL/DL configuration may be used as the DL-reference TDD UL/DL configuration. The third TDD UL/DL configuration may be used as the UL-reference TDD UL/DL configuration. The eNB 160 should ensure there is no conflict between the TDD UL/DL configurations. Therefore, the DL subframes of the second UL/DL configuration should be a superset of the DL subframes of the third UL/DL configurations, and the UL subframes of the second UL/DL configuration should be a subset of the UL subframes of the third UL/DL configurations. For example, the second TDD UL/DL configuration and the third TDD UL/DL configuration may be selected based on the DL-reference TDD UL/DL configuration and the UL-reference TDD UL/DL configuration listed in Table (5). Thus, not all combinations of TDD UL/DL configurations are supported.

In yet another implementation, among the two secondary TDD UL/DL configurations (e.g., the second and third TDD UL/DL configurations), the order of the TDD UL/DL configurations is fixed. The second TDD UL/DL configuration may be used as the UL-reference TDD UL/DL configuration. The third TDD UL/DL configuration may be used as the DL-reference TDD UL/DL configuration. The eNB 160 should ensure there is no conflict between the TDD UL/DL configurations. Therefore, the DL subframes of the second UL/DL configuration should be a subset of the DL subframes of the third UL/DL configurations, and the UL subframes of the second UL/DL configuration should be a superset of the UL subframes of the third UL/DL configurations. For example, the second TDD UL/DL configuration and the third TDD UL/DL configuration may be selected based on the UL-reference TDD UL/DL configuration and the DL-reference TDD UL/DL configuration listed in Table (5). Thus, not all combinations of TDD UL/DL configurations are supported.

In another approach, the primary and both of the two secondary TDD UL/DL configurations are used to determine 206 the reference TDD UL/DL configurations. In other words, the reference TDD UL/DL configurations may be based on the first TDD UL/DL configuration 128, the second TDD UL/DL configuration and the third TDD UL/DL configuration. The first (e.g., primary) TDD UL/DL configuration 128 and the secondary TDD UL/DL configurations may be any combination.

The DL-reference TDD UL/DL configuration may be the TDD UL/DL configuration with overlapping UL subframes among the first TDD UL/DL configuration 128 and the two secondary TDD UL/DL configurations. The DL-reference TDD UL/DL configuration may be selected from the existing TDD UL/DL configurations. If the TDD UL/DL configuration with overlapping UL subframes among the first TDD UL/DL configuration 128 and the two secondary TDD UL/DL configurations is not an existing standard TDD UL/DL configuration (0-6), the closest standard TDD UL/DL configuration with less UL allocations may be selected as the DL-reference TDD UL/DL configuration. The DL-reference TDD UL/DL configuration may be the same as one of the first TDD UL/DL configuration 128 or one of the secondary TDD UL/DL configurations. Alternatively, the DL-reference TDD UL/DL configuration may be different than both the first TDD UL/DL configuration 128 and the secondary TDD UL/DL configurations.

The UL-reference TDD UL/DL configuration may be the TDD UL/DL configuration with overlapping DL or special subframes among the first TDD UL/DL configuration 128 and the two secondary TDD UL/DL configurations. The UL-reference TDD UL/DL configuration may also be the TDD UL/DL configuration with a superset of UL subframes among the first TDD UL/DL configuration 128 and the two secondary TDD UL/DL configurations. The UL-reference TDD UL/DL configuration may be selected from the existing TDD UL/DL configurations. If the TDD UL/DL configuration with overlapping DL or special subframes among the first TDD UL/DL configuration 128 and the secondary TDD UL/DL configurations is not an existing standard TDD UL/DL configuration (0-6), the closest standard TDD UL/DL configuration with more UL allocations may be selected as the UL-reference TDD UL/DL configuration. The UL-reference TDD UL/DL configuration may be the same as one of the first TDD UL/DL configuration 128 or secondary TDD UL/DL configurations. The UL-reference TDD UL/DL configuration may be different than both the first TDD UL/DL configuration 128 and the secondary TDD UL/DL configurations.

Table (5) may be used to determine 206 the DL-reference TDD UL/DL configuration and the UL-reference TDD UL/DL configuration. This may be accomplished in two steps.

For the DL-reference TDD UL/DL configuration of the dynamic TDD UL/DL reconfiguration cell, first a secondary DL-reference TDD UL/DL configuration based on the combination of the two secondary TDD UL/DL configurations (i.e., the second TDD UL/DL configuration and the third TDD UL/DL configuration) may be determined. Then the DL-reference TDD UL/DL configuration of the dynamic TDD UL/DL reconfiguration cell may be determined 206 based on the combination of the primary TDD UL/DL configuration (e.g., the first TDD UL/DL configuration 128) and the secondary DL-reference TDD UL/DL configuration.

For the UL-reference TDD UL/DL configuration of the dynamic TDD UL/DL reconfiguration cell, first a secondary UL-reference TDD UL/DL configuration based on the combination of the two secondary TDD UL/DL configurations (i.e., the second TDD UL/DL configuration and the third TDD UL/DL configuration) may be determined. Then the UL-reference TDD UL/DL configuration of the dynamic TDD UL/DL reconfiguration cell may be determined 206 based on the combination of the primary TDD UL/DL configuration (e.g., the first TDD UL/DL configuration 128) and the secondary UL-reference TDD UL/DL configuration.

It should be noted that a legacy UE 102 may receive 202 only the first TDD UL/DL configuration 128 (e.g., the primary TDD UL/DL configuration), and assumes the cell as a legacy TDD cell with the first TDD UL/DL configuration 128. If the dynamic TDD UL/DL reconfiguration cell is a PCell, and the secondary TDD UL/DL configurations are transmitted in an SIB1 message, then legacy UEs 102 may ignore the secondary TDD configuration IE (e.g., the tdd-Config-r12 field).

A Release-12 UE 102 configured with a dynamic TDD UL/DL reconfiguration cell may receive 202, 204 both the primary and secondary TDD UL/DL configuration(s). The secondary TDD UL/DL configurations may be cell-specific or UE-specific.

If a dynamic TDD UL/DL reconfiguration cell is a PCell, and the secondary TDD UL/DL configurations are transmitted in an SIB1 message, then the secondary TDD UL/DL configurations for the dynamic TDD UL/DL reconfiguration cell should be cell specific. If a dynamic TDD UL/DL reconfiguration cell is a PCell, and the secondary TDD UL/DL configurations are transmitted only in the RRC common message block, then the RRC common message may be UE-specific. The UE 102 may assume the UE-specific TDD UL/DL configuration is applied on the dynamic TDD UL/DL reconfiguration cell.

If a dynamic TDD UL/DL reconfiguration cell is an SCell, then the secondary TDD UL/DL configurations may only be transmitted in the RRC common message block in a UE-specific manner. The UE 102 may assume the UE-specific TDD UL/DL configuration is applied on the dynamic TDD UL/DL reconfiguration cell.

Figure 3:
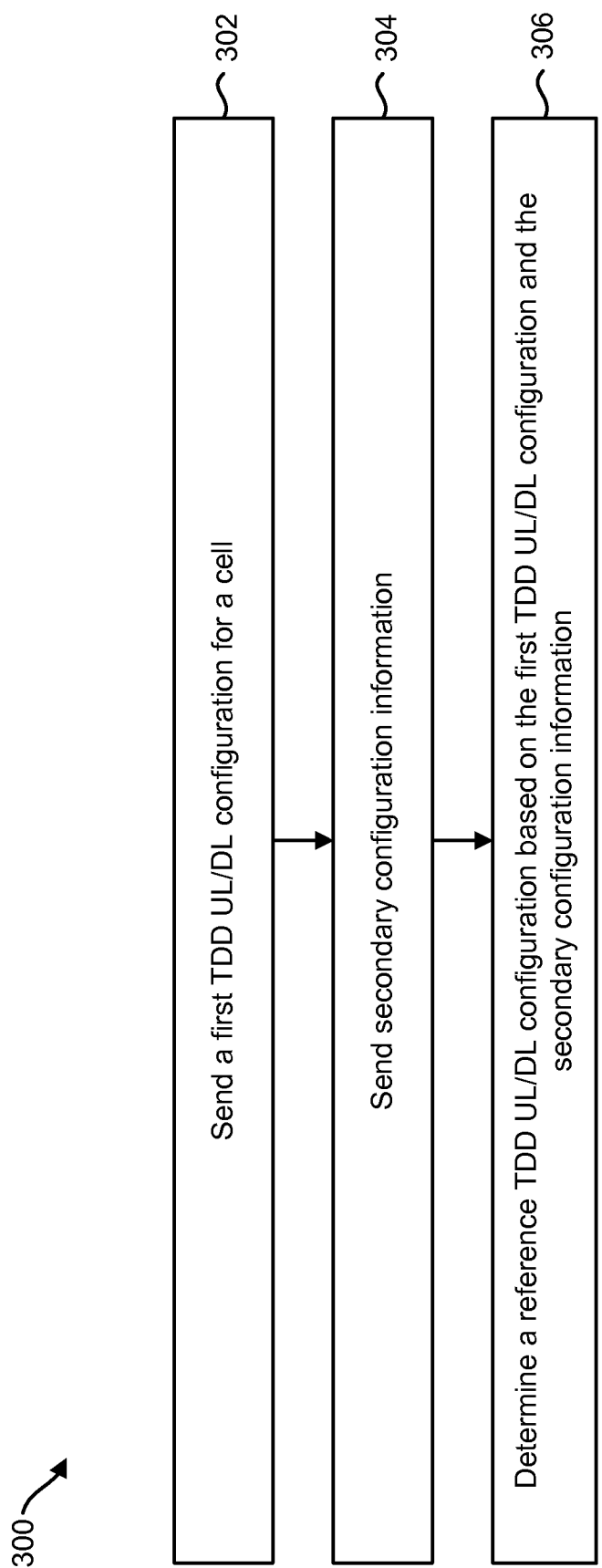
FIG. 3 is a flow diagram illustrating one implementation of a method 300 for configuration signaling by an eNB.

FIG. 3 is a flow diagram illustrating one implementation of a method 300 for configuration signaling by an eNB 160. The eNB 160 may be configured with dynamic TDD UL/DL reconfiguration (e.g., eIMTA support). The eNB 160 may send 302 a first TDD UL/DL configuration 128 for a cell.

The cell may be a dynamic TDD UL/DL reconfiguration cell (e.g., an eIMTA cell). A dynamic TDD UL/DL reconfiguration cell may be used as a primary serving cell (PCell) or a secondary serving cell (SCell). Different TDD UL/DL configuration signaling methods may be employed for an eIMTA PCell and an eIMTA SCell. The eNB 160 may send 302 signaling to configure the UE 102 with the serving cell. The signaling may indicate the first TDD UL/DL configuration 128 for the serving cell.

The first TDD UL/DL configuration 128 may be the default TDD UL/DL configuration for the cell. The first TDD UL/DL configuration 128 may also be referred to as a primary TDD UL/DL configuration. The first TDD UL/DL configuration 128 may be signaled as described above in connection with FIG. 2. For example, the first TDD UL/DL configuration 128 may be signaled by a tdd-Config information element (IE) as in Release-8, 9, 10 and 11 for a PCell.

If the cell is a PCell, in one implementation, the eNB 160 may send 302 the first TDD UL/DL configuration 128 in a tdd-Config field in a SIB1 block. An example of signaling the first TDD UL/DL configuration 128 in an SIB is illustrated in Listing (1) above. The TDD-config IE may specify the TDD-specific physical channel configuration as illustrated in Listing (2) above.

In another implementation, if the cell is a PCell, the eNB 160 may send 302 the first TDD UL/DL configuration 128 in an RRC common message. For example, a tdd-Config field in a RRC common block may be used to indicate the first TDD UL/DL configuration 128 of the cell. An example of signaling the first TDD UL/DL configuration 128 in an RRC common block is illustrated in Listing (3) above.

If the cell is an SCell, the eNB 160 may also send 302 the first TDD UL/DL configuration 128 in an RRC common message. An example of signaling the first TDD UL/DL configuration 128 of an SCell in an RRC common block is illustrated in Listing (4) above.

The eNB 160 may send 304 secondary configuration information 130 for the cell. In one implementation, the eNB 160 may send 304 the secondary configuration information 130 in the same message (e.g., SIB or RRC) as the first TDD UL/DL configuration 128. In another implementation, the eNB 160 may send 304 the secondary configuration information 130 in a message (e.g., SIB or RRC) separate from the first TDD UL/DL configuration 128.

The secondary configuration information 130 may include an allowed TDD UL/DL reconfiguration range. The TDD UL/DL reconfiguration range may be a set of TDD UL/DL configurations, or any states between two TDD UL/DL configurations.

In one implementation, in addition to the first TDD UL/DL configuration 128, at least a second TDD UL/DL configuration may be configured for the dynamic TDD UL/DL reconfiguration cell. In another implementation, a second TDD UL/DL configuration and a third TDD UL/DL configuration may be configured in addition to the first TDD UL/DL configuration 128.

The eNB 160 may send 304 the secondary configuration information 130 in a secondary TDD configuration IE. The secondary TDD configuration IE may include one or two secondary TDD UL-DL configurations (e.g., the second or third TDD UL/DL configurations).

In one implementation, the secondary TDD UL/DL configurations may be indicated in the secondary TDD configuration IE. For one extra TDD UL/DL configuration, the eNB 160 may send 304 a secondary TDD configuration IE as illustrated in Listing (5) above. For two extra TDD UL/DL configurations, the eNB 160 may send 304 a secondary TDD configuration IE as illustrated in Listing (6) above.

In another implementation, all combinations of different TDD UL/DL configurations may be enumerated in a table of combinations of TDD UL/DL configurations, as illustrated in Table (1) and Table (2) above. An index of the table entries may be used to indicate the allowed TDD UL/DL reconfiguration range.

Different TDD UL/DL configuration signaling methods may be employed for a dynamic TDD UL/DL reconfiguration PCell and a dynamic TDD UL/DL reconfiguration SCell. If a dynamic TDD UL/DL reconfiguration cell is a PCell, the secondary TDD UL/DL configurations may be signaled in an SIB, as illustrated in Listing (8) above, or in an RRC block, as illustrated in Listing (9) above. If a dynamic TDD UL/DL reconfiguration cell is an SCell, the secondary configuration information 130 may be signaled by adding an extension tdd-Config-r12 field in an RRC block, as illustrated in Listing (10) above.

The eNB 160 may determine 306 the reference TDD UL/DL configurations based on either or both of the first TDD UL/DL configuration 128 and the secondary configuration information 130. A DL-reference TDD UL/DL configuration may be determined 306 based on either or both of the first (e.g., primary) TDD UL/DL configuration 128 and the secondary configuration information 130 (e.g., secondary TDD UL/DL configurations). The DL-reference TDD UL/DL configuration may be used for PDSCH HARQ-ACK timing of the dynamic TDD UL/DL reconfiguration cell. A UL-reference TDD UL/DL configuration may also be determined 306 based on either or both of the first TDD UL/DL configuration 128 and the secondary configuration information 130. The UL-reference TDD UL/DL configuration may be used for PUSCH scheduling and PUSCH HARQ-ACK timing of the dynamic TDD UL/DL reconfiguration cell.

The reference TDD UL/DL configurations (e.g., DL-reference and UL-reference TDD UL/DL configurations) may be determined 306 in different ways depending on whether the secondary configuration information 130 includes one or two secondary TDD UL/DL configurations.

In one scenario, the secondary configuration information 130 may include one extra TDD UL/DL configuration, which may be a second TDD UL/DL configuration. In one implementation, the DL-reference TDD UL/DL configuration may be selected from the existing TDD UL/DL configurations, as described above in connection with FIG. 2. For example, if the TDD UL/DL configuration with overlapping UL subframes among the first TDD UL/DL configuration 128 and the second TDD UL/DL configuration is not an existing standard TDD UL/DL configuration (0-6), the closest standard TDD UL/DL configuration with less UL allocations may be selected as the DL-reference TDD UL/DL configuration, as illustrated above in Table (5).

The UL-reference TDD UL/DL configuration may also be selected from the existing TDD UL/DL configurations, as described above in connection with FIG. 2. For example, if the TDD UL/DL configuration with overlapping DL or special subframes among the first TDD UL/DL configuration 128 and the second TDD UL/DL configurations is not an existing standard TDD UL/DL configuration (0-6), the closest standard TDD UL/DL configuration with more UL allocations may selected as the UL-reference TDD UL/DL configuration, as illustrated above in Table (5).

In another implementation, the first TDD UL/DL configuration 128 may be used as the DL-reference TDD UL/DL configuration. The second TDD UL/DL configuration may be used as the UL-reference TDD UL/DL configuration. Therefore, the DL subframes of the first UL/DL configuration 128 should be a superset of the DL subframes of the second UL/DL configurations, and the UL subframes of the first UL/DL configuration should be a subset of the UL subframes of the second UL/DL configurations. For example, the first TDD UL/DL configuration 128 and the second TDD UL/DL configuration should be selected based on the DL-reference TDD UL/DL configuration and the UL-reference TDD UL/DL configuration listed in Table (5). Thus, not all combinations of TDD UL/DL configurations are supported.

In yet another implementation, the first TDD UL/DL configuration 128 may be used as the UL-reference TDD UL/DL configuration. The second TDD UL/DL configuration may be used as the DL-reference TDD UL/DL configuration. Therefore, the DL subframes of the first UL/DL configuration 128 should be a subset of the DL subframes of the second UL/DL configurations, and the UL subframes of the first UL/DL configuration 128 should be a superset of the UL subframes of the second UL/DL configurations. For example, the first TDD UL/DL configuration 128 and the second TDD UL/DL configuration should be selected based on the UL-reference TDD UL/DL configuration and the DL-reference TDD UL/DL configuration listed in Table (5). Thus, not all combinations of TDD UL/DL configurations are supported.

In another scenario, the secondary configuration information 130 may include two extra TDD UL/DL configurations, which may be a second TDD UL/DL configuration and a third TDD UL/DL configuration. In one approach, only the secondary TDD UL/DL configurations (e.g., the second and third TDD UL/DL configurations) are used to determine 306 the reference TDD UL/DL configurations, as described in FIG. 2. In another approach, the primary and both of the two secondary TDD UL/DL configurations are used to determine the reference TDD UL/DL configurations, as described in FIG. 2.

Figure 4:
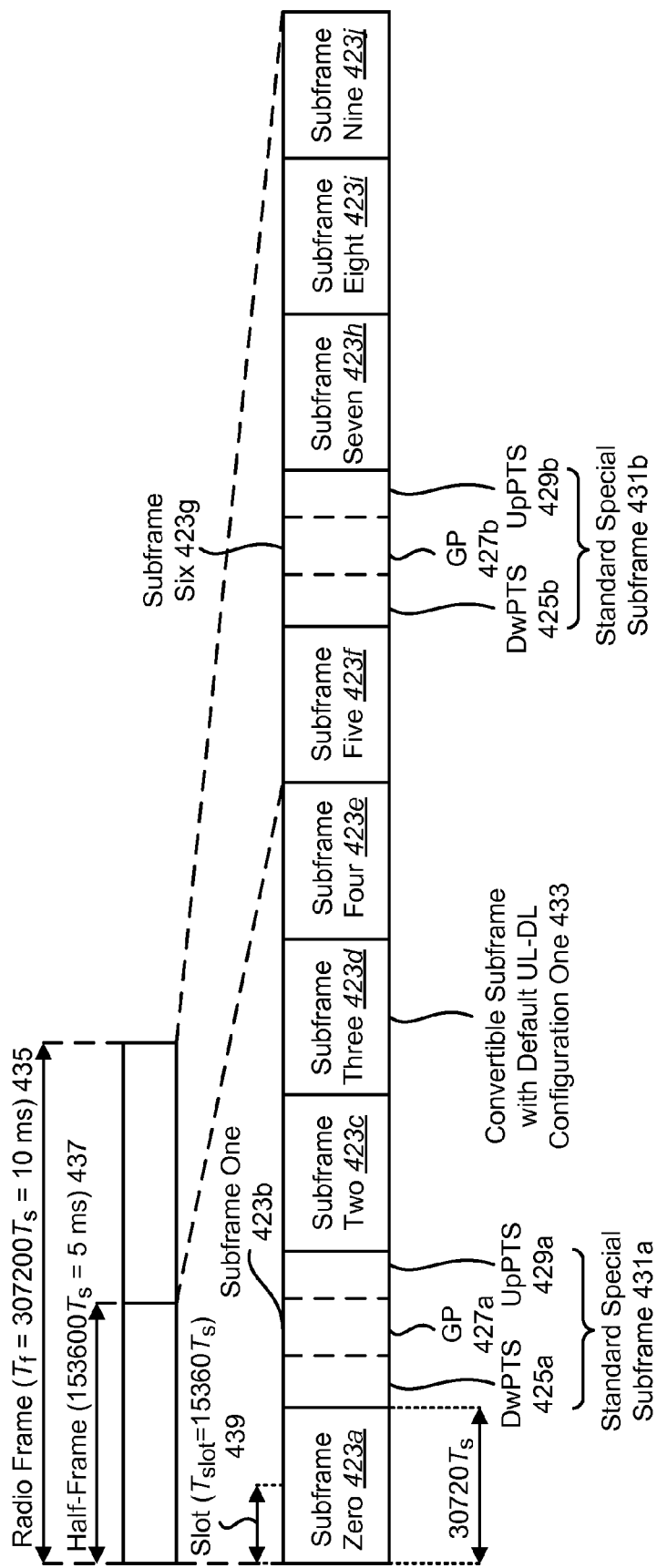
FIG. 4 is a diagram illustrating one example of a radio frame 435 that may be used in accordance with the systems and methods disclosed herein.

FIG. 4 is a diagram illustrating one example of a radio frame 435 that may be used in accordance with the systems and methods disclosed herein. This radio frame 435 structure illustrates a TDD structure. Each radio frame 435 may have a length of $T_f = 307200 \cdot T_s = 10$ ms, where $T_f$ is a radio frame 435 duration and $T_s$ is a time unit equal to $$\frac{1}{(15000 \times 2048)} \text{ seconds.}$$

The radio frame 435 may include two half-frames 437, each having a length of $153600 \cdot T_s = 5$ ms. Each half-frame 437 may include five subframes 423a-e, 423f-j each having a length of $30720 \cdot T_s = 1$ ms.

TDD UL/DL configurations 0-6 are given below in Table (6) (from Table 4.2-2 in 3GPP TS 36.211). TDD UL/DL configurations with both 5 ms and 10 ms downlink-to-uplink switch-point periodicity may be supported. In particular, seven TDD UL/DL configurations are specified in 3GPP specifications, as shown in Table (6) below. In Table (6), "D" denotes a downlink subframe, "S" denotes a special subframe and "U" denotes a UL subframe.

TABLE (6)

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (6) above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (7) (from Table 4.2-1 of 3GPP TS 36.211) subject to the total length of DwPTS, GP and UpPTS being equal to $30720 \cdot T_s = 1$ ms. Table (7) illustrates several configurations of (standard) special subframes. Each subframe i is defined as two slots, 2i and 2i+1 of length $T_{slot} = 15360 \cdot T_s = 0.5$ ms in each subframe. In Table (7), "cyclic prefix" is abbreviated as "CP" and "configuration" is abbreviated as "Config" for convenience.

TABLE (7)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

TDD UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 423 that may be used include a downlink subframe, an uplink subframe and a special subframe 431. In the example illustrated in FIG. 4, which has a 5 ms periodicity, two standard special subframes 431a-b are included in the radio frame 435.

The first special subframe 431a includes a downlink pilot time slot (DwPTS) 425a, a guard period (GP) 427a and an uplink pilot time slot (UpPTS) 429a. In this example, the first standard special subframe 431a is included in subframe one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (7) above) subject to the total length of each set of DwPTS 425, GP 427 and UpPTS 429 being equal to $30720 \cdot T_s = 1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot} = 15360 \cdot T_s = 0.5$ ms in each subframe 423. For example, subframe zero (e.g., 0) 423a may include two slots, including a first slot 439.

TDD UL/DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 437 includes a standard special subframe 431a-b. In the case of 10 ms downlink-to-uplink switch-point periodicity, a special subframe may exist in the first half-frame 437 only.

Subframe zero (e.g., 0) 423a and subframe five (e.g., 5) 423f and DwPTS 425a-b may be reserved for DL transmission. The UpPTS 429a-b and the subframe(s) immediately following the standard special subframe(s) 431a-b (e.g., subframe two 423c and subframe seven 423h) may be reserved for UL transmission. In one implementation, in a case where multiple cells are aggregated, a UE 102 may assume the same TDD UL/DL configuration across all the cells and that the guard period (GP) of the special subframe(s) in the different cells have an overlap of at least $1456 \cdot T_s$.

Enhanced interference mitigation with traffic adaptation (eIMTA) is a major topic for TDD LTE networks to enable more flexible use of spectrum using dynamic UL/DL allocation. Therefore, some subframes may be flexible and convertible (e.g., flexible subframes) and can be used as either a downlink subframe, an uplink subframe or a special subframe. Some subframes may not be flexible or convertible (e.g., fixed subframes). From the DL HARQ-ACK timing point of view, a special subframe is viewed as a DL subframe. One or more of the subframes 423 illustrated in FIG. 4 may be convertible, depending on the TDD UL/DL reconfiguration range. Assuming a default TDD UL/DL configuration 1 as given in Table (6) above, for example, subframe three (e.g., 3) 423d may be a convertible subframe 433 (from UL-to-DL, for instance).

Figure 5:
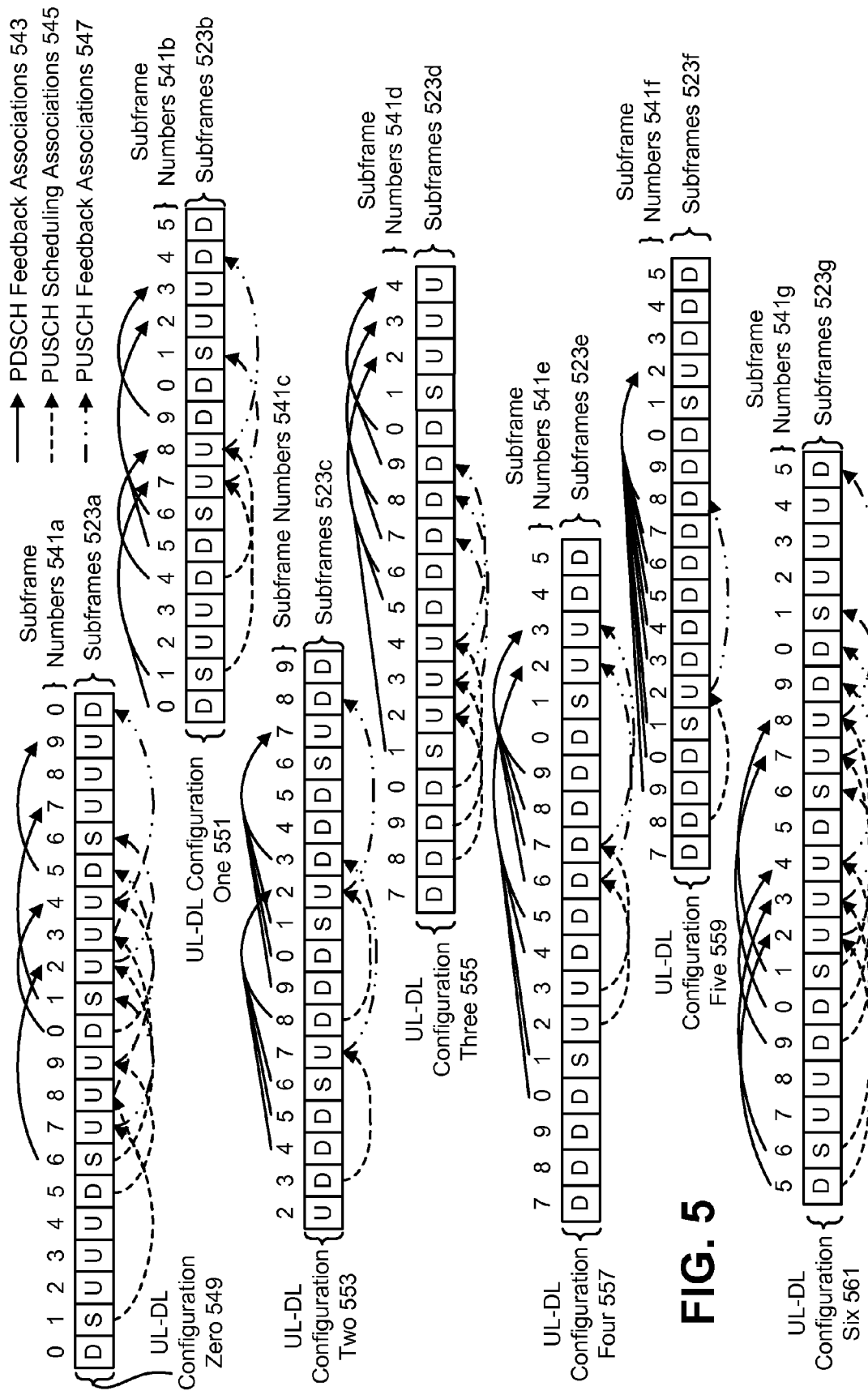
FIG. 5 is a diagram illustrating some time-division duplexing (TDD) uplink/downlink (UL/DL) configurations in accordance with the systems and methods described herein.

FIG. 5 is a diagram illustrating some TDD UL/DL configurations 549, 551, 553, 555, 557, 559, 561 in accordance with the systems and methods described herein. In particular, FIG. 5 illustrates TDD UL/DL configuration zero 549 (e.g., "TDD UL/DL configuration 0") with subframes 523a and subframe numbers 541a, TDD UL/DL configuration one 551 (e.g., "TDD UL/DL configuration 1") with subframes 523b and subframe numbers 541b, TDD UL/DL configuration two 553 (e.g., "TDD UL/DL configuration 2") with subframes 523c and subframe numbers 541c and TDD UL/DL configuration three 555 (e.g., "TDD UL/DL configuration 3") with subframes 523d and subframe numbers 541d. FIG. 5 also illustrates TDD UL/DL configuration four 557 (e.g., "TDD UL/DL configuration 4") with subframes 523e and subframe numbers 541e, TDD UL/DL configuration five 559 (e.g., "TDD UL/DL configuration 5") with subframes 523f and subframe numbers 541f and TDD UL/DL configuration six 561 (e.g., "TDD UL/DL configuration 6") with subframes 523g and subframe numbers 541g.

Furthermore, FIG. 5 illustrates PDSCH feedback associations 543 (e.g., PDSCH HARQ-ACK feedback on PUCCH or PUSCH associations), PUSCH scheduling associations 545 (e.g., downlink scheduling for PUSCH transmission associations) and PUSCH feedback associations 547 (e.g., PUSCH HARQ-ACK feedback on PHICH or PDCCH associations) corresponding to each TDD UL/DL configuration. It should be noted that some of the radio frames illustrated in FIG. 5 have been truncated for convenience.

The systems and methods may be applied to one or more of the TDD UL/DL configurations 549, 551, 553, 555, 557, 559, 561 illustrated in FIG. 5. For example, one or more PDSCH feedback associations 543 corresponding to one of the TDD UL/DL configurations illustrated in FIG. 5 may be applied to communications between a (Release-12) UE 102 and eNB 160 when determined as a DL-reference TDD UL/DL configuration. Additionally or alternatively, one or more PUSCH scheduling associations 545 corresponding to one of the TDD UL/DL configurations illustrated in FIG. 5 may be applied to communications between a UE 102 and eNB 160 when determined as a UL-reference TDD UL/DL configuration. Additionally or alternatively, one or more PUSCH feedback associations 547 corresponding to one of the TDD UL/DL configurations illustrated in FIG. 5 may be applied to communications between a UE 102 and eNB 160 when determined as a UL-reference TDD UL/DL configuration.

FIG. 6 is a diagram illustrating an example of determining a DL-reference TDD UL/DL configuration 663 and a UL-reference TDD UL/DL configuration 665. Various TDD UL/DL configurations 653, 657, 663 and 665 are illustrated. Subframe numbers 641a-d correspond to particular subframes 623a-d. In these examples, TDD UL/DL configuration two 653 and TDD UL/DL configuration four 657 may be a primary or secondary TDD UL/DL configuration.

As described above in connection with FIG. 2, a DL-reference TDD UL/DL configuration 663 and UL-reference TDD UL/DL configuration 665 may be determined based on a combination of a primary TDD UL/DL configuration and one or two secondary TDD UL/DL configurations. The combinations of TDD UL/DL configurations are illustrated in Table (5) above.

A DL-reference TDD UL/DL configuration may be selected from the existing TDD UL/DL configurations. If the TDD UL/DL configuration with overlapping UL subframes among the primary TDD UL/DL configuration and the secondary TDD UL/DL configuration is not an existing standard TDD UL/DL configuration (0-6), the closest standard TDD UL/DL configuration with less UL allocations may be selected as the DL-reference TDD UL/DL configuration.

An example of determining the DL-reference TDD UL/DL configuration 663 in accordance with the disclosed systems and methods is illustrated in FIG. 6. If an eIMTA TDD UL/DL configuration combination is formed by TDD UL/DL configuration two 653 and TDD UL/DL configuration four 657, the DL-reference TDD UL/DL configuration 663 is TDD UL/DL configuration five 659. In this example, TDD UL/DL configuration five 659 is the closest standard TDD UL/DL configuration with less UL allocations. The overlapping UL subset regions 667 are indicated on the DL-reference TDD UL/DL configuration 663. The overlapping UL subset regions 667 are illustrated in conjunction with TDD UL/DL configuration five 659 in FIG. 6.

The UL-reference TDD UL/DL configuration 665 may also be selected from the existing TDD UL/DL configurations. If the TDD UL/DL configuration with overlapping DL or special subframes among the primary TDD UL/DL configuration and the secondary TDD UL/DL configurations is not an existing standard TDD UL/DL configuration (0-6), the closest standard TDD UL/DL configuration with more UL allocations may selected as the UL-reference TDD UL/DL configuration 665.

An example of determining the UL-reference TDD UL/DL configuration 665 in accordance with the disclosed systems and methods is also illustrated in FIG. 6. If an eIMTA TDD UL/DL configuration combination is formed by TDD UL/DL configuration two 653 and TDD UL/DL configuration four 657, the UL-reference TDD UL/DL configuration 665 is TDD UL/DL configuration one 651. In this example, TDD UL/DL configuration one 651 is the closest standard TDD UL/DL configuration with more UL allocations. The UL superset regions 669 are indicated on the UL-reference TDD UL/DL configuration 665. The UL superset regions 669 are illustrated in conjunction with TDD UL/DL configuration one 651 in FIG. 6.

It should be noted that in this example, the DL-reference TDD UL/DL configuration 663 and the UL-reference TDD UL/DL configuration 665 are different from both eIMTA configured TDD UL/DL configurations. However, in other scenarios, the DL-reference TDD UL/DL configuration 663 and/or the UL-reference TDD UL/DL configuration 665 may be the same as one of the eIMTA configured TDD UL/DL configurations, as illustrated in Table (5).

Figure 7:
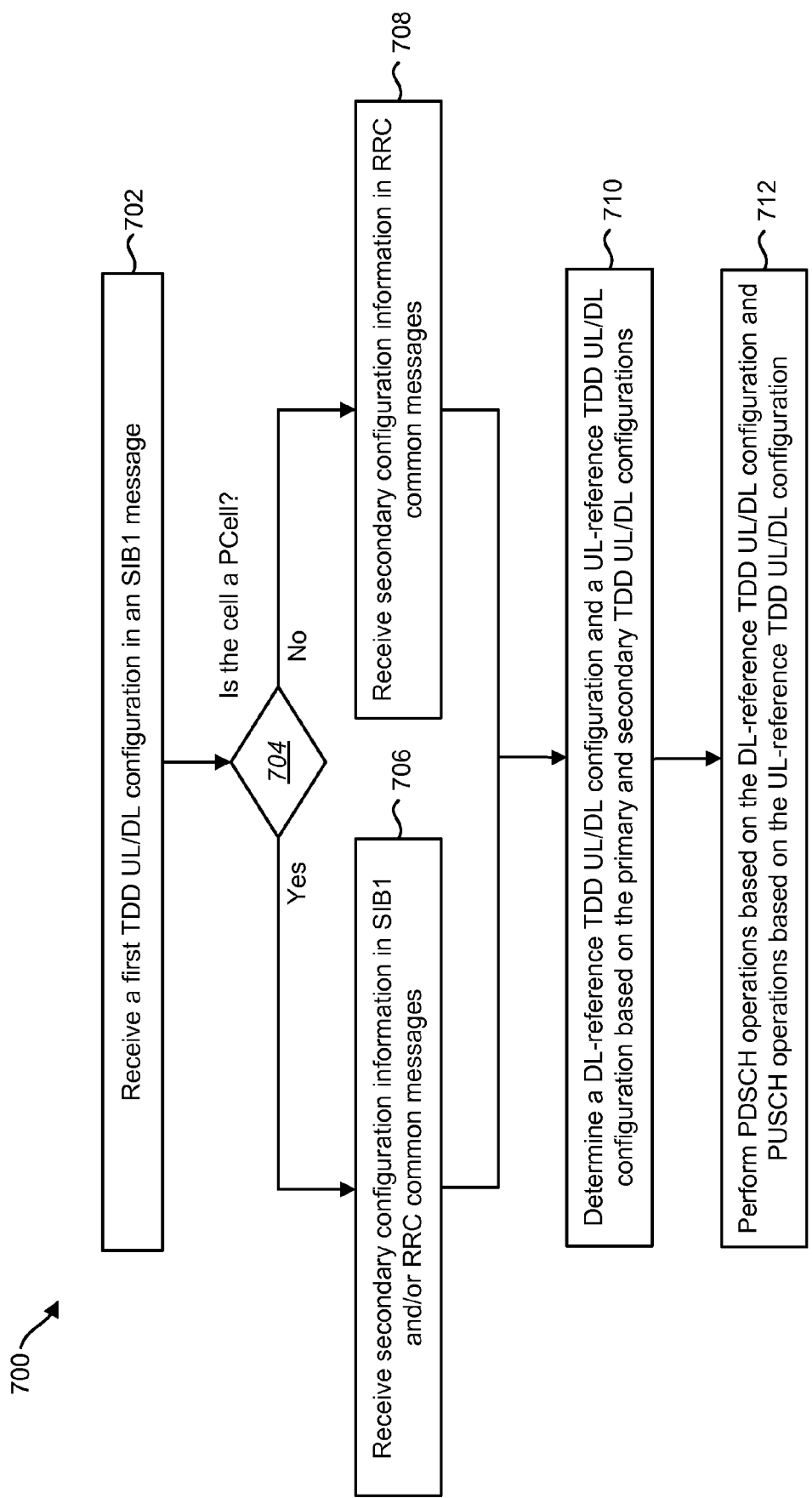
FIG. 7 is a flow diagram illustrating a more detailed implementation of a method 700 for configuration signaling by a UE.

FIG. 7 is a flow diagram illustrating a more detailed implementation of a method 700 for configuration signaling by a UE 102. The UE 102 may be configured with dynamic TDD UL/DL reconfiguration (e.g., eIMTA support). The UE 102 may receive 702 a first (e.g., primary) TDD UL/DL configuration 128 in an SIB1 message. The SIB1 message may be received 702 from an eNB 160. The first TDD UL/DL configuration 128 may be for a cell that is configured with dynamic UL/DL reconfiguration.

The SIB1 message received 702 by the UE 102 may be implemented as illustrated in Listing (1). For example, a TDD-config IE may be used to specify the first TDD UL/DL configuration 128 for the cell. The TDD-config IE may specify the TDD-specific physical channel configuration as illustrated in Listing (2).

The UE 102 may determine 704 whether the cell is a PCell. If the cell is a PCell, the UE 102 may receive 706 secondary configuration information 130 in an SIB1 and/or an RRC common message. The secondary configuration information 130 may include an allowed TDD UL/DL reconfiguration range. For example, the TDD UL/DL reconfiguration range may be a set of TDD UL/DL configurations. In one implementation, the secondary configuration information 130 may include a second TDD UL/DL configuration. In another implementation, the secondary configuration information 130 may include a second and a third TDD UL/DL configuration.

For a PCell, the UE 102 may receive 706 the secondary configuration information 130 in an SIB1 as illustrated in Listing (8) above. Additionally or alternatively, for a PCell, the UE 102 may receive 706 the secondary configuration information 130 in an RRC common message as illustrated in Listing (9) above. The RRC common message signaling of the secondary configuration information 130 may be used independently or together with the SIB1 signaling.

If the UE 102 determines 704 that the cell is not a PCell (e.g., the cell is an SCell), then the UE 102 may receive 708 the secondary configuration information 130 in an RRC common message. This may be accomplished as illustrated in Listing (10) above.

The UE 102 may determine 710 a DL-reference TDD UL/DL configuration 663 and a UL-reference TDD UL/DL configuration 665 based on the primary and secondary TDD UL/DL configuration. The DL-reference TDD UL/DL configuration 663 and UL-reference TDD UL/DL configuration 665 may be determined 710 in different ways depending on whether the secondary configuration information 130 includes one or two secondary TDD UL/DL configurations.

In one scenario, the secondary configuration information 130 may include one extra TDD UL/DL configuration, which may be a second TDD UL/DL configuration. In one implementation, the DL-reference TDD UL/DL configuration 663 and UL-reference TDD UL/DL configuration 665 may be selected from the existing TDD UL/DL configurations, as illustrated above in Table (5). In another implementation, the first TDD UL/DL configuration 128 may be used as the DL-reference TDD UL/DL configuration 663, and the second TDD UL/DL configuration may be used as the UL-reference TDD UL/DL configuration 665, as described in connection with FIG. 2. In yet another implementation, the first TDD UL/DL configuration 128 may be used as the UL-reference TDD UL/DL configuration 665, and the second TDD UL/DL configuration may be used as the DL-reference TDD UL/DL configuration 663, as described in connection with FIG. 2.

In another scenario, the secondary configuration information 130 may include two extra TDD UL/DL configurations, which may be a second TDD UL/DL configuration and a third TDD UL/DL configuration. In one approach, only the secondary TDD UL/DL configurations (e.g., the second and third TDD UL/DL configurations) are used to determine 710 the reference TDD UL/DL configurations, as described in FIG. 2. In another approach, the primary and both of the two secondary TDD UL/DL configurations are used to determine 710 the reference TDD UL/DL configurations, as described in FIG. 2.

The UE 102 may perform 712 PDSCH operations based on the DL-reference TDD UL/DL configuration 663, and PUSCH operations based on the UL-reference TDD UL/DL configuration 665. For example, the DL-reference TDD UL/DL configuration 663 may be used for PDSCH HARQ-ACK reporting timing, as indicated in Table (3) above. Therefore, the UE 102 may send PDSCH HARQ-ACK information based on the DL-reference TDD UL/DL configuration 663.

The UL-reference TDD UL/DL configuration 665 may be used to perform 712 PUSCH operations. For example, the UL-reference TDD UL/DL configuration 665 may be used for PUSCH scheduling and PUSCH HARQ-ACK timing.

Therefore, the UE 102 may send a PUSCH transmission and/or receive PUSCH HARQ-ACK information based on the UL-reference TDD UL/DL configuration 665.

Figure 8:
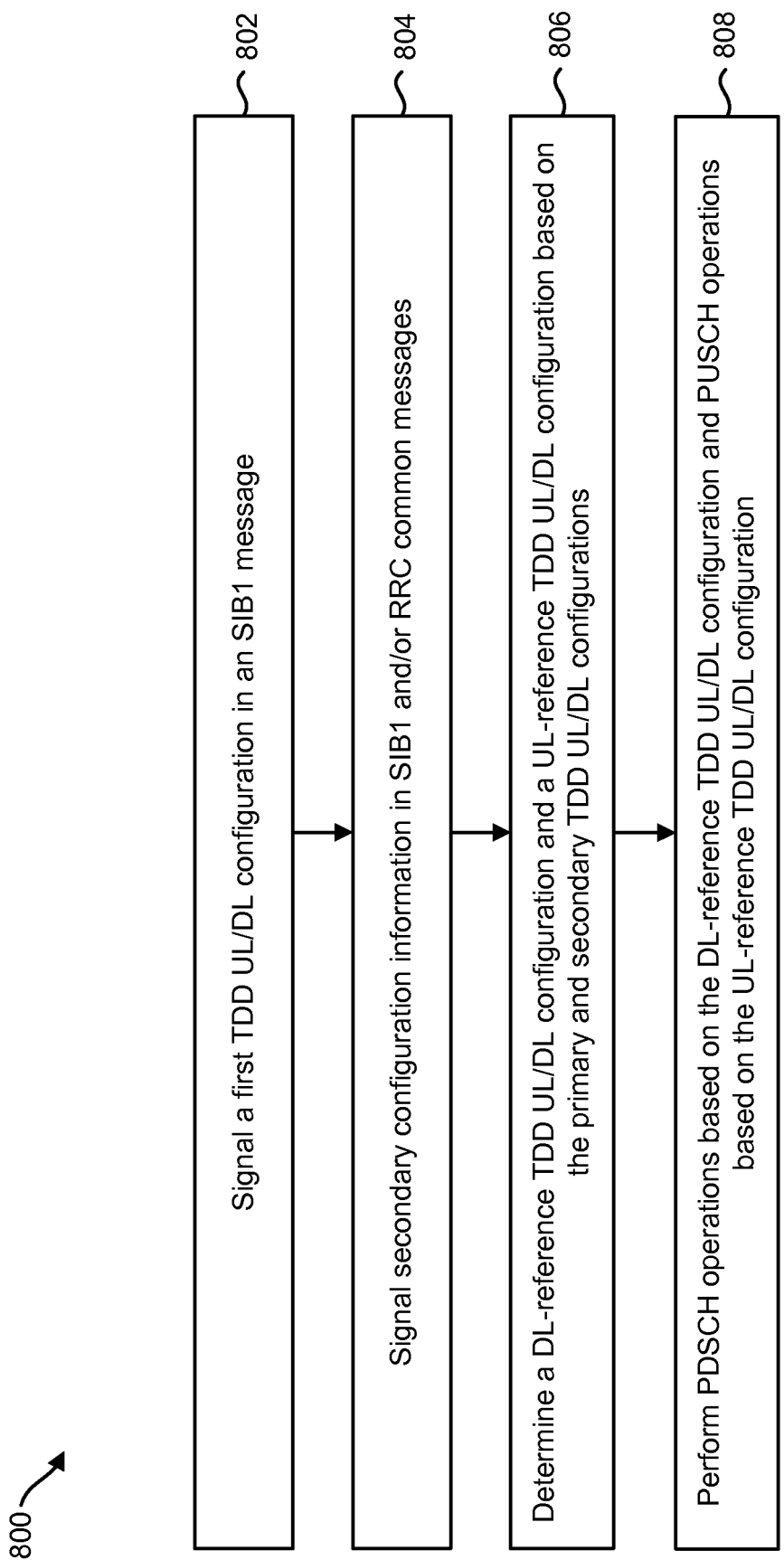
FIG. 8 is a flow diagram illustrating a more detailed implementation of a method 800 for configuration signaling by an eNB.

FIG. 8 is a flow diagram illustrating a more detailed implementation of a method 800 for configuration signaling by an eNB 160. The eNB 160 may be configured with dynamic TDD UL/DL reconfiguration (e.g., eIMTA) support). The eNB 160 may signal 802 a first (e.g., primary) TDD UL/DL configuration 128 in an SIB1 message. The SIB1 message may be signaled (e.g., sent) 802 to a UE 102. The first TDD UL/DL configuration 128 may be for a cell that is configured with dynamic UL/DL reconfiguration.

The SIB1 message signaled 802 by the eNB 160 may be implemented as illustrated in Listing (1). For example, a TDD-config IE may be used to specify the first TDD UL/DL configuration 128 for the cell. The TDD-config IE may specify the TDD-specific physical channel configuration as illustrated in Listing (2).

The eNB 160 may signal 804 secondary configuration information 130 in an SIB1 and/or an RRC common message. The secondary configuration information 130 may include an allowed TDD UL/DL reconfiguration range. For example, the TDD UL/DL reconfiguration range may be a set of TDD UL/DL configurations. In one implementation, the secondary configuration information 130 may include a second TDD UL/DL configuration. In another implementation, the secondary configuration information 130 may include a second and a third TDD UL/DL configuration.

For a PCell, the eNB 160 may signal 804 the secondary configuration information 130 in an SIB1 message as illustrated in Listing (8) above. Additionally or alternatively, for a PCell, the eNB 160 may signal 804 the secondary configuration information 130 in an RRC common message as illustrated in Listing (9) above. The RRC common message signaling of the secondary configuration information 130 may be used independently or together with the SIB1 signaling.

For an SCell, the eNB 160 may signal 804 the secondary configuration information 130 in an RRC common message. This may be accomplished as illustrated in Listing (10) above.

The eNB 160 may determine 806 a DL-reference TDD UL/DL configuration 663 and a UL-reference TDD UL/DL configuration 665 based on the primary and secondary TDD UL/DL configuration. The DL-reference TDD UL/DL configuration 663 and UL-reference TDD UL/DL configuration 665 may be determined 806 in different ways depending on whether the secondary configuration information 130 includes one or two secondary TDD UL/DL configurations.

In one scenario, the secondary configuration information 130 may include one extra TDD UL/DL configuration, which may be a second TDD UL/DL configuration. In one implementation, the DL-reference TDD UL/DL configuration 663 and UL-reference TDD UL/DL configuration 665 may be selected from the existing TDD UL/DL configurations, as illustrated above in Table (5). In another implementation, the first (e.g., primary) TDD UL/DL configuration 128 may be used as the DL-reference TDD UL/DL configuration 663, and the second TDD UL/DL configuration may be used as the UL-reference TDD UL/DL configuration 665, as described in connection with FIG. 2. In yet another implementation, the first TDD UL/DL configuration 128 may be used as the UL-reference TDD UL/DL configuration 665, and the second TDD UL/DL configuration may be used as the DL-reference TDD UL/DL configuration 663, as described in connection with FIG. 2.

In another scenario, the secondary configuration information 130 may include two extra TDD UL/DL configurations, which may be a second TDD UL/DL configuration and a third TDD UL/DL configuration. In one approach, only the secondary TDD UL/DL configurations (e.g., the second and third TDD UL/DL configurations) are used to determine 806 the reference TDD UL/DL configurations, as described in FIG. 2. In another approach, the primary and both of the two secondary TDD UL/DL configurations are used to determine 806 the reference TDD UL/DL configurations, as described in FIG. 2.

The eNB 160 may perform 808 PDSCH operations based on the DL-reference TDD UL/DL configuration 663 and PUSCH operations based on the UL-reference TDD UL/DL configuration 665. For example, the DL-reference TDD UL/DL configuration 663 may be used for PDSCH HARQ-ACK reporting timing, as indicated in Table (3) above. Therefore, the eNB 160 may receive PDSCH HARQ-ACK information based on the DL-reference TDD UL/DL configuration 663.

The UL-reference TDD UL/DL configuration 665 may be used to perform 808 PUSCH operations. For example, the UL-reference TDD UL/DL configuration 665 may be used for PUSCH scheduling and PUSCH HARQ-ACK timing. Therefore, the eNB 160 may receive a PUSCH transmission and/or send PUSCH HARQ-ACK information based on the UL-reference TDD UL/DL configuration 665.

Figure 9:
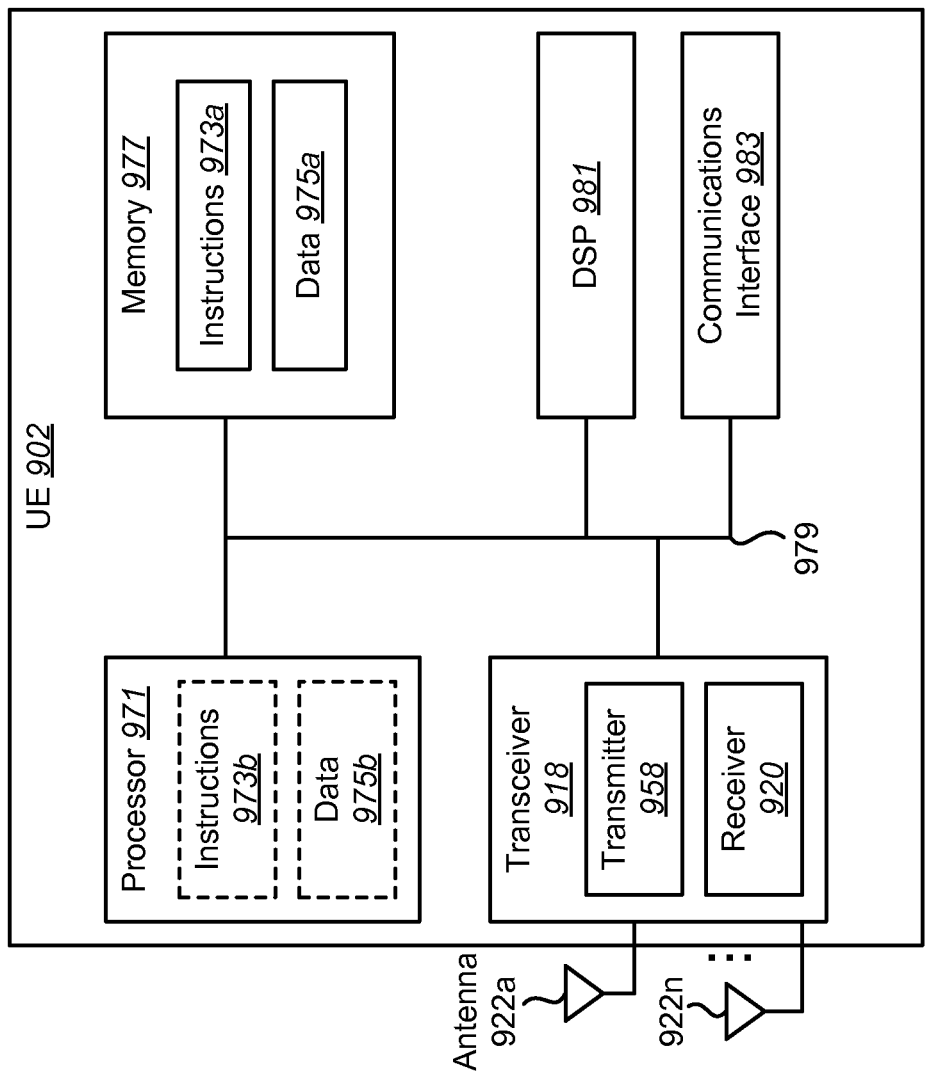
FIG. 9 illustrates various components that may be utilized in a UE.

FIG. 9 illustrates various components that may be utilized in a UE 902. The UE 902 described in connection with FIG. 9 may be implemented in accordance with the UE 102 described in connection with FIG. 1. The UE 902 includes a processor 969 that controls operation of the UE 902. The processor 969 may also be referred to as a central processing unit (CPU). Memory 977, which may include read-only memory (ROM), random access memory (RAM), a combination of the two or any type of device that may store information, provides instructions 973a and data 975a to the processor 969. A portion of the memory 977 may also include non-volatile random access memory (NVRAM). Instructions 973b and data 975b may also reside in the processor 969. Instructions 973b and/or data 975b loaded into the processor 969 may also include instructions 973a and/or data 975a from memory 977 that were loaded for execution or processing by the processor 969. The instructions 973b may be executed by the processor 969 to implement one or more of the methods 200 and 700 described above.

The UE 902 may also include a housing that contains one or more transmitters 958 and one or more receivers 920 to allow transmission and reception of data. The transmitter(s) 958 and receiver(s) 920 may be combined into one or more transceivers 918. One or more antennas 922a-n are attached to the housing and electrically coupled to the transceiver 918.

The various components of the UE 902 are coupled together by a bus system 979, which may include a power bus, a control signal bus and a status signal bus, in addition to a data bus. However, for the sake of clarity, the various buses are illustrated in FIG. 9 as the bus system 979. The UE 902 may also include a digital signal processor (DSP) 981 for use in processing signals. The UE 902 may also include a communications interface 983 that provides user access to the functions of the UE 902. The UE 902 illustrated in FIG. 9 is a functional block diagram rather than a listing of specific components.

Figure 10:
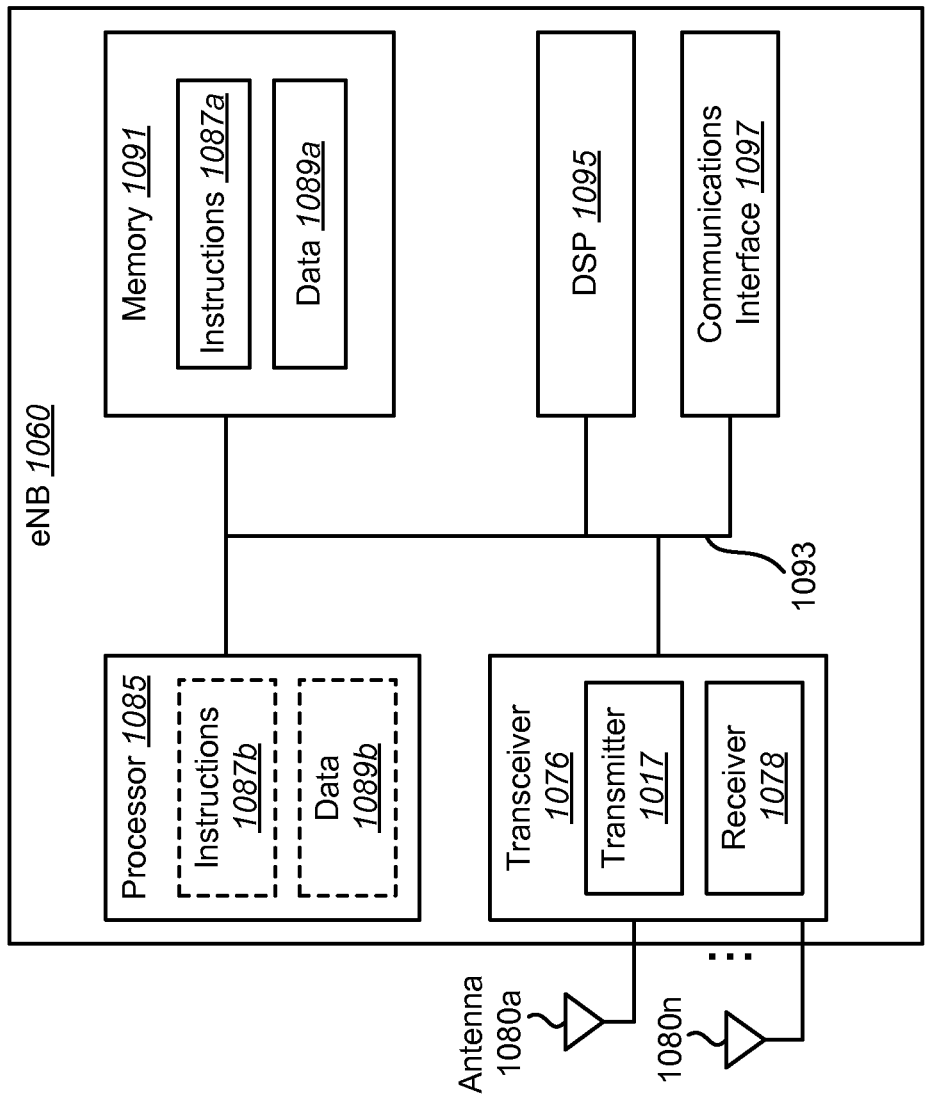
FIG. 10 illustrates various components that may be utilized in an eNB.

FIG. 10 illustrates various components that may be utilized in an eNB 1060. The eNB 1060 described in connection with FIG. 10 may be implemented in accordance with the eNB 160 described in connection with FIG. 1. The eNB 1060 includes a processor 1085 that controls operation of the eNB 1060. The processor 1085 may also be referred to as a central processing unit (CPU). Memory 1091, which may include read-only memory (ROM), random access memory (RAM), a combination of the two or any type of device that may store information, provides instructions 1087a and data 1089a to the processor 1085. A portion of the memory 1091 may also include non-volatile random access memory (NVRAM). Instructions 1087b and data 1089b may also reside in the processor 1085. Instructions 1087b and/or data 1089b loaded into the processor 1085 may also include instructions 1087a and/or data 1089a from memory 1091 that were loaded for execution or processing by the processor 1085. The instructions 1087b may be executed by the processor 1085 to implement one or more of the methods 300 and 800 described above.

The eNB 1060 may also include a housing that contains one or more transmitters 1017 and one or more receivers 1078 to allow transmission and reception of data. The transmitter(s) 1017 and receiver(s) 1078 may be combined into one or more transceivers 1076. One or more antennas 1080a-n are attached to the housing and electrically coupled to the transceiver 1076.

The various components of the eNB 1060 are coupled together by a bus system 1093, which may include a power bus, a control signal bus and a status signal bus, in addition to a data bus. However, for the sake of clarity, the various buses are illustrated in FIG. 10 as the bus system 1093. The eNB 1060 may also include a digital signal processor (DSP) 1095 for use in processing signals. The eNB 1060 may also include a communications interface 1097 that provides user access to the functions of the eNB 1060. The eNB 1060 illustrated in FIG. 10 is a functional block diagram rather than a listing of specific components.

Figure 11:
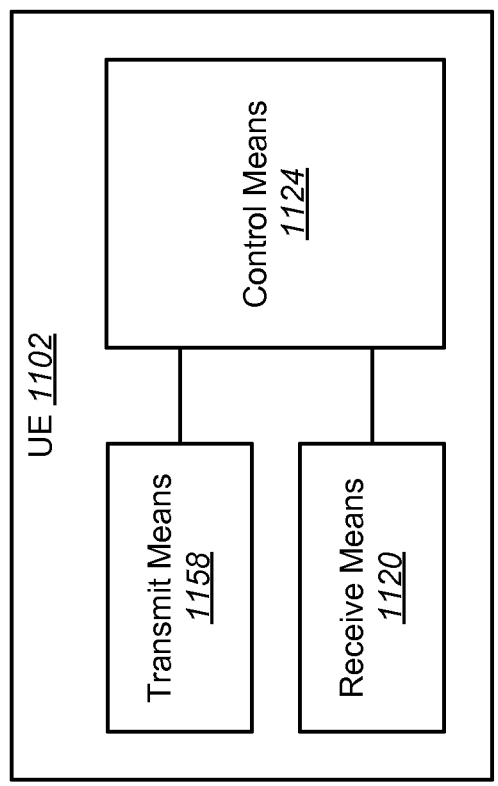
FIG. 11 is a block diagram illustrating one configuration of a UE in which systems and methods for feedback reporting may be implemented.

FIG. 11 is a block diagram illustrating one configuration of a UE 1102 in which systems and methods for feedback reporting may be implemented. The UE 1102 includes transmit means 1158, receive means 1120 and control means 1124. The transmit means 1158, receive means 1120 and control means 1124 may be configured to perform one or more of the functions described in connection with FIG. 2, FIG. 7 and FIG. 9 above. FIG. 9 above illustrates one example of a concrete apparatus structure of FIG. 11. Other various structures may be implemented to realize one or more of the functions of FIG. 2, FIG. 7 and FIG. 9. For example, a DSP may be realized by software.

Figure 12:
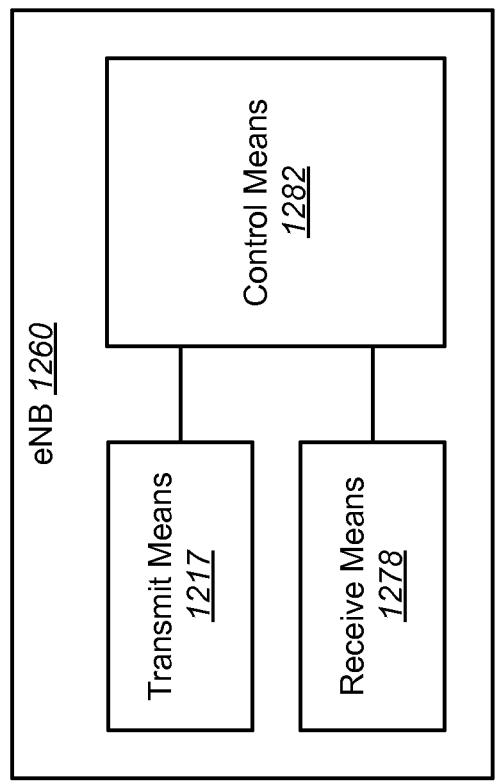
FIG. 12 is a block diagram illustrating one configuration of an eNB in which systems and methods for feedback reporting may be implemented.

FIG. 12 is a block diagram illustrating one configuration of an eNB 1260 in which systems and methods for feedback reporting may be implemented. The eNB 1260 includes transmit means 1217, receive means 1278 and control means 1282. The transmit means 1217, receive means 1278 and control means 1282 may be configured to perform one or more of the functions described in connection with FIG. 3, FIG. 8 and FIG. 10 above. FIG. 10 above illustrates one example of a concrete apparatus structure of FIG. 12. Other various structures may be implemented to realize one or more of the functions of FIG. 3, FIG. 8 and FIG. 10. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, Electrically Erasable Programmable Read-Only Memory (EEPROM), Compact Disc Read-Only Memory (CD-ROM) or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A user equipment (UE) for receiving time-division duplexing (TDD) uplink/downlink (UL/DL) configurations, comprising:

a processor; and non-transitory memory in electronic communication with the processor, wherein instructions stored in the memory are executable to cause the processor to:

receive a first time-division duplexing (TDD) uplink/downlink (UL/DL) TDD UL/DL configuration for a cell and secondary configuration information that comprises at least a second TDD UL/DL configuration for the cell, wherein supported combinations of the first TDD UL/DL configuration and the second TDD UL/DL configuration are defined and not all combinations of the first TDD UL/DL configuration and the second TDD UL/DL configuration are supported;

determine a downlink (DL)-reference TDD UL/DL configuration based on the second TDD UL/DL configuration which is signaled in a radio resource control (RRC) message;

perform Physical Downlink Shared Channel (PDSCH) operations based on at least the DL-reference TDD UL/DL configuration;

determine an uplink (UL)-reference TDD UL/DL configuration based on the first TDD UL/DL configuration which is signaled in a system information block (SIB) or an RRC message; and perform Physical Uplink Shared Channel (PUSCH) operations based on at least the UL-reference TDD UL/DL configuration.

2. The UE of claim 1, wherein a combination of the first TDD UL/DL configuration and the second TDD UL/DL configuration defines a set of TDD UL/DL configurations for a dynamic TDD UL/DL reconfiguration, wherein the secondary configuration information is signaled in at least one system information block (SIB) or at least one radio resource control (RRC) common message, and wherein the SIB or RRC common message comprises a secondary TDD configuration information element.

3. The UE of claim 1, wherein the instructions stored in the memory are further executable to cause the processor to:
   receive a third TDD UL/DL configuration; and
   perform PDSCH operations and PUSCH operations on the basis of at least the first TDD UL/DL configuration, the second TDD UL/DL configuration and the third TDD UL/DL configuration.

4. An evolved Node B (eNB) for sending time-division duplexing (TDD) uplink/downlink (UL/DL) configurations, comprising:
   a processor; and
   non-transitory memory in electronic communication with the processor, wherein instructions stored in the memory are executable to cause the processor to:
      send a first time-division duplexing (TDD) uplink/downlink (UL/DL) TDD UL/DL configuration for a cell and secondary configuration information that comprises at least a second TDD UL/DL configuration, wherein supported combinations of the first TDD UL/DL configuration and the second TDD UL/DL configuration are defined and not all combinations of the first TDD UL/DL configuration and the second TDD UL/DL configuration are supported;
      determine a downlink (DL)-reference TDD UL/DL configuration based on the second TDD UL/DL configuration which is signaled in a radio resource control (RRC) message;
      perform Physical Downlink Shared Channel (PDSCH) operations based on at least the DL-reference TDD UL/DL configuration;
      determine an uplink (UL)-reference TDD UL/DL configuration based on the first TDD UL/DL configuration which is signaled in a system information block (SIB) or an RRC message; and
      perform Physical Uplink Shared Channel (PUSCH) operations based on at least the UL-reference TDD UL/DL configuration.

5. The eNB of claim 4, wherein a combination of the first TDD UL/DL configuration and the second TDD UL/DL configuration defines a set of TDD UL/DL configurations for a dynamic TDD UL/DL reconfiguration, wherein the secondary configuration information is signaled in at least one system information block (SIB) or at least one radio resource control (RRC) common message, and wherein the SIB or RRC common message comprises a secondary TDD configuration information element.

6. The eNB of claim 4, wherein the instructions stored in the memory are further executable to cause the processor to:
   send a third TDD UL/DL configuration; and
   perform PDSCH operations and PUSCH operations on the basis of at least the first TDD UL/DL configuration, the second TDD UL/DL configuration and the third TDD UL/DL configuration.

7. A method for receiving time-division duplexing (TDD) uplink/downlink (UL/DL) configurations performed by a user equipment (UE), comprising:
   receiving a first time-division duplexing (TDD) uplink/downlink (UL/DL) TDD UL/DL configuration for a cell and secondary configuration information that comprises at least a second TDD UL/DL configuration for the cell, wherein supported combinations of the first TDD UL/DL configuration and the second TDD UL/DL configuration are defined and not all combinations of the first TDD UL/DL configuration and the second TDD UL/DL configuration are supported;
   determining a downlink (DL)-reference TDD UL/DL configuration based on the second TDD UL/DL configuration which is signaled in a radio resource control (RRC) message;
   performing Physical Downlink Shared Channel (PDSCH) operations based on at least the DL-reference TDD UL/DL configuration;
   determining an uplink (UL)-reference TDD UL/DL configuration based on the first TDD UL/DL configuration which is signaled in a system information block (SIB) or an RRC message; and
   performing Physical Uplink Shared Channel (PUSCH) operations based on at least the UL-reference TDD UL/DL configuration.

8. The method of claim 7, wherein a combination of the first TDD UL/DL configuration and the second TDD UL/DL configuration defines a set of TDD UL/DL configurations for a dynamic TDD UL/DL reconfiguration, wherein the secondary configuration information is signaled in at least one system information block (SIB) or at least one radio resource control (RRC) common message, and wherein the SIB or RRC common message comprises a secondary TDD configuration information element.

9. The method of claim 7, further comprising:
   receiving a third TDD UL/DL configuration; and
   performing PDSCH operations and PUSCH operations on the basis of at least the first TDD UL/DL configuration, the second TDD UL/DL configuration and the third TDD UL/DL configuration.

10. A method for sending time-division duplexing (TDD) uplink/downlink (UL/DL) configurations performed by an evolved Node B (eNB), comprising:
   sending a first time-division duplexing (TDD) uplink/downlink (UL/DL) TDD UL/DL configuration for a cell and secondary configuration information that comprises at least a second TDD UL/DL configuration for the cell, wherein supported combinations of the first TDD UL/DL configuration and the second TDD UL/DL configuration are defined and not all combinations of the first TDD UL/DL configuration and the second TDD UL/DL configuration are supported;
   determining a downlink (DL)-reference TDD UL/DL configuration based on the second TDD UL/DL configuration which is signaled in a radio resource control (RRC) message;
   performing Physical Downlink Shared Channel (PDSCH) operations based on at least the DL-reference TDD UL/DL configuration;
   determining an uplink (UL)-reference TDD UL/DL configuration based on the first TDD UL/DL configuration which is signaled in a system information block (SIB) or an RRC message; and
   performing Physical Uplink Shared Channel (PUSCH) operations based on at least the UL-reference TDD UL/DL configuration.

11. The method of claim 10, wherein a combination of the first TDD UL/DL configuration and the second TDD UL/DL configuration defines a set of TDD UL/DL configurations for a dynamic TDD UL/DL reconfiguration, wherein the secondary configuration information is signaled in at least one system information block (SIB) or at least one radio resource control (RRC) common message, and wherein the SIB or RRC common message comprises a secondary TDD configuration information element.

12. The method of claim 10, further comprising:
sending a third TDD UL/DL configuration; and
performing PDSCH operations and PUSCH operations on the basis of at least the first TDD UL/DL configuration, the second TDD UL/DL configuration and the third TDD UL/DL configuration.

\* \* \* \* \*